United States Patent
Moore et al.

(10) Patent No.: US 12,166,744 B2
(45) Date of Patent: *Dec. 10, 2024

(54) METHODS AND SYSTEMS FOR EFFICIENT ENCRYPTED SNI FILTERING FOR CYBERSECURITY APPLICATIONS

(71) Applicant: Centripetal Networks, LLC, Portsmouth, NH (US)

(72) Inventors: Sean Moore, Hollis, NH (US); Vincent Mutolo, Portsmouth, NH (US); Jonathan R. Rogers, Hampton Falls, NH (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,354

(22) Filed: Apr. 17, 2023

(65) Prior Publication Data

US 2023/0412561 A1     Dec. 21, 2023

Related U.S. Application Data

(63) Continuation of application No. 17/175,747, filed on Feb. 15, 2021, now Pat. No. 11,646,996, which is a
(Continued)

(51) Int. Cl.
*H04L 29/06* (2006.01)
*H04L 9/40* (2022.01)
*H04L 61/4511* (2022.01)

(52) U.S. Cl.
CPC ...... *H04L 63/0236* (2013.01); *H04L 61/4511* (2022.05); *H04L 63/0281* (2013.01); *H04L 63/205* (2013.01); *H04L 63/306* (2013.01)

(58) Field of Classification Search
CPC ............ H04L 63/0236; H04L 61/4511; H04L 63/0281; H04L 63/205; H04L 63/306
See application file for complete search history.

(56) References Cited

U.S. PATENT DOCUMENTS

| 9,137,217 B1 * | 9/2015 | Martini .................. H04L 61/10 |
| 9,237,168 B2 | 1/2016 | Wang et al. |

(Continued)

FOREIGN PATENT DOCUMENTS

| CN | 107135190 A | 9/2017 |
| IN | 201402279 I4 * | 1/2016 |

(Continued)

OTHER PUBLICATIONS

W. M. Shbair, T. Cholez, A. Goichot and I. Chrisment, "Efficiently bypassing SNI-based HTTPS filtering," 2015 IFIP/IEEE International Symposium on Integrated Network Management (IM), Ottawa, ON, Canada, 2015, pp. 990-995. (Year: 2015).*

(Continued)

*Primary Examiner* — Shawnchoy Rahman
(74) *Attorney, Agent, or Firm* — Banner & Witcoff, Ltd.

(57) ABSTRACT

A packet-filtering system described herein may be configured to filter packets with encrypted hostnames in accordance with one or packet-filtering rules. The packet-filtering system may resolve a plaintext hostname from ciphertext comprising an encrypted Server Name Indication (eSNI) value. The packet-filtering system may resolve the plaintext hostname using a plurality of techniques. Once the plaintext hostname is resolved, the packet-filtering system may then use the plaintext hostname to determine whether the packets are associated with one or more threat indicators. If the packet-filtering system determines that the packets are associated with one or more threat indicators, the packet-filtering
(Continued)

system may apply a packet filtering operation associated with the packet-filtering rules to the packets.

30 Claims, 15 Drawing Sheets

Related U.S. Application Data continuation of application No. 16/928,083, filed on Jul. 14, 2020, now Pat. No. 10,924,456.

(56) References Cited

U.S. PATENT DOCUMENTS

| | | | |
|---|---|---|---|
| 9,419,942 | B1 | 8/2016 | Buruganahalli et al. |
| 9,917,856 | B2 | 3/2018 | Ahn et al. |
| 10,284,526 | B2 | 5/2019 | Moore |
| 10,547,638 | B1 | 1/2020 | Li et al. |
| 10,594,658 | B1 | 3/2020 | Vixie |
| 10,924,456 | B1 | 2/2021 | Moore et al. |
| 2008/0086574 | A1* | 4/2008 | Raciborski .......... H04L 61/4541 709/245 |
| 2012/0227109 | A1 | 9/2012 | Dimuro |
| 2016/0006693 | A1* | 1/2016 | Salcedo .............. H04L 63/0414 726/1 |
| 2017/0187733 | A1 | 6/2017 | Ahn et al. |
| 2018/0295142 | A1 | 10/2018 | Manadhata |
| 2019/0080088 | A1 | 3/2019 | Tock et al. |
| 2019/0222588 | A1 | 7/2019 | Marzorati et al. |
| 2020/0053145 | A1 | 2/2020 | Dowd et al. |
| 2020/0074092 | A1* | 3/2020 | Fliam .................... G06F 16/907 |
| 2020/0274815 | A1 | 8/2020 | Sreevalsan et al. |
| 2021/0112040 | A1 | 4/2021 | Niemi et al. |
| 2021/0218714 | A1 | 7/2021 | Wang et al. |

FOREIGN PATENT DOCUMENTS

| | | | |
|---|---|---|---|
| WO | WO-2012101623 A1 * | 8/2012 | ............ G06F 21/51 |
| WO | 2020/127148 A1 | 6/2020 | |

OTHER PUBLICATIONS

Hoang, Nguyen Phong, et al. "Assessing the privacy benefits of domain name encryption." Proceedings of the 15th ACM Asia Conference on Computer and Communications Security. 2020. (Year: 2020).*
Jun. 1, 2020, E. Rescorla et al. TLS Encrypted Client Hello Draft-ietf-tls-esni-07.
Oct. 3, 2018, Encrypted SNI death Blow to Transparent filtering; David Redekop to DNS Security.
Jul. 12, 2021, Office Action of U.S. Appl. No. 17/307,080.
Nov. 19, 2021—(EP) Extended European Search Report—App. No. 21185646.3.
Hoang et al., "Assessing the Privacy Benefits of Domain Name Encryption," arXiv.org, arXiv:1911.00563v3 (Jul. 8, 2020).
May 12, 2022, International Search Report of PCT/US21/41635.
2015, W.M. Shbair, T. Cholez, A. Goichot and I. Chrisment, "Efficiently bypassing SNI-based HTTPS Filtering," IFIP/IEEE International Symposium on Integrated Network Management, Ottawa, CA.
2019, Chai, Zimo, Amirhossein Ghafari, and Amir Houmansadr, "On the Importance of Encrypted-SNI (ESNI) to Censorship Circumvention." FOCI@USENIX Security Symposium.
Feb. 22, 2024, Office Action of JP Application No. 2023-501496.

* cited by examiner

FIG. 3

| | IP-Address 301 | CTI-ESNI-Domains 302 | #CTI-ESNI-Domains 303 | #CTI-Domains 304 | #Reverse-IP-Lookup-Domains 305 | ... |
|---|---|---|---|---|---|---|
| Row 310 | 102.2.18.81 | formmens.cf kottoqui.ga ... fqnaoutlet.tk | 8 | 8 | 0 | ... |
| Row 311 | 40.07.25.13 | pgorlzex.cn x-advice.onln bmb27.com | 3 | 3 | 3 | ... |
| Row 312 | 14.99.65.22 | pulka2.com 903ta.com ... cakbacon.cn | 5 | 5 | 20 | ... |
| Row 313 | 6203:7400:3340::8 618:46ef | jlek.ga 8lkq5b.tk ... ferkeym.tk | 9 | 15 | 15 | ... |
| Row 314 | 22.74.02.18 | toplipts.com | 1 | 1 | 1 | ... |
| ... | ... | ... | ... | ... | ... | ... |

300

METHODS AND SYSTEMS FOR EFFICIENT ENCRYPTED SNI FILTERING FOR CYBERSECURITY APPLICATIONS

CROSS-REFERENCE TO RELATED APPLICATIONS

This application is a continuation of co-pending application U.S. application Ser. No. 17/175,747, filed on Feb. 15, 2021 and entitled "Methods and Systems for Efficient Encrypted SNI Filtering For Cybersecurity Applications," which is a continuation of U.S. application Ser. No. 16/928,083, filed on Jul. 14, 2020 and entitled "Methods and Systems for Efficient Encrypted SNI Filtering For Cybersecurity Applications," which issued as U.S. Pat. No. 10,924,456 on Feb. 16, 2021, the entireties of which are incorporated herein by reference.

FIELD

Aspects described herein generally relate to computer hardware and software and network security. In particular, one or more aspects of the disclosure generally relate to computer hardware and software for efficient packet filtering of Transport Layer Security (TLS) handshake messages containing ciphertext that corresponds to Server Name Indication (SNI) (e.g., encrypted SNI (eSNI)) values in relation to cybersecurity applications and more generally to network communications policy enforcement applications.

BACKGROUND

Network security is becoming increasingly important as the information age continues to unfold. Network threats and/or attacks may take a variety of forms (e.g., unauthorized requests or data transfers, viruses, malware, large volumes of traffic designed to overwhelm resources (e.g., DDoS), and the like). Many of these threats use the Internet to access and attack enterprise computer resources and/or assets. For example, enterprise hosts, such as desktop computers, mobile devices, on-premises or cloud enterprise applications servers, public-facing web servers, and the like, may be directly connected (e.g., attached) to private networks (e.g., TCP/IP networks) that are owned and/or operated and administrated by enterprises, such as commercial businesses, governments, nation-states, and the like. These enterprise networks are, in turn, directly connected to the Internet so that an enterprise's hosts may, for example, access other publicly addressed Internet-attached hosts (e.g., public-facing web servers, application servers, etc.). In some instances, however, the enterprise hosts may be accessing Internet-attached hosts, or Internet hosts, that are malicious in nature, for example, when an enterprise host's operator/user has been socially engineered to click on a phishing e-mail link that communicates with a malicious Internet host. In other instances, the enterprise hosts may be communicating with Internet hosts in violation of the enterprise's network communication policies.

Enterprises may attempt to protect their networks from malicious actors, or otherwise enforce network communications policies, by, for example, installing network packet filtering devices at the boundary (e.g., at or near one or more Internet access links) between an enterprise network and the Internet that can inspect host-to-host communications (in the form of in-transit L2/L3 packets) crossing the boundary. These packet filtering devices may determine if the communications are malicious in nature, or otherwise in violation of enterprise communications policies, and, if so, enforce policies that protect the enterprise network from the threat or violation (e.g., block the communications by dropping associated IP packets). Enterprises may also use such network devices to enforce an enterprise's communications policies, for example, by controlling and/or monitoring access to certain Internet hosts. One approach to enforcing such policies may be for network packet filtering devices to inspect, or filter, the communications' in-transit packets for instances of domain names (e.g., fully qualified domain names (FQDNs)), such as malicious-adware-site.net, that are associated with packet-filtering rules in the policies. If a match is found between a packet and a rule, then a network packet filtering device may drop the packet. The popular HTTP protocol, used to transfer and mediate many web, e-commerce, social media, etc. communications, often includes such domain names of Internet hosts in the HTTP messages. Filtering in-transit packets for domain names that are contained in HTTP messages is a policy enforcement technique. Similarly, other application-layer protocols (e.g., DNS, SMTP, SIP, and the like) may include domain names that may be used during policy enforcement. Enterprise communications policies may also include privacy protection & preservation (P3) policies that may be defined by the enterprise itself or by, for example, external entities that have regulatory or compliance authority over the enterprise, e.g., HIPAA, PCI DSS, etc. Enterprise communications policies may also include support for law enforcement (LE) applications, e.g., lawful intercept.

In-transit network traffic may be secured via encryption, for example, using the Transport Layer Security (TLS) protocols. The TLS handshake protocol may be used first to establish a secure encrypted connection, or tunnel, between two hosts connected by a network (e.g., TCP/IP network). The TLS record protocol may be used to securely transfer application-layer data comprising the communications through the tunnel. When an HTTP session is secured by TLS, the combination is labeled "HTTPS" and is generally considered to be an extension of HTTP. The application layer of the in-transit HTTPS packets contains the encrypted HTTP messages (which are encapsulated in TLS record protocol packets). The plaintext HTTP messages, and thus any domain names, contained in the in-transit HTTPS packets cannot be read by an observer. This secures the HTTP sessions from malicious actors that may be eavesdropping, but also prevents non-malicious/legitimate packet filtering devices and associated applications from reading any domain names contained in the HTTP messages. This may prevent enterprises from enforcing their communications policies and protecting their networks.

The TLS handshake protocol ClientHello message, however, may include the (plaintext) domain name, or hostname, associated with the to-be-secured/encrypted application (e.g. HTTP) session in a ClientHello message's Server Name Indication (SNI) extension (RFC 6066). Enterprise packet filtering devices and associated applications, as well as eavesdroppers, may continue to read and potentially act on domain names associated with TLS-secured sessions by inspecting the cleartext SNI field of a ClientHello message contained in an in-transit packet. To further secure TLS, however, one or more extensions to TLS are being developed that will support encryption of the SNI value while in-transit. A skilled artisan would generally understand this extension(s) and associated technologies as "ESNI." A primary purpose of ESNI is to mitigate the risk of domain name eavesdropping by malicious actors. But enterprises that protect their networks and enforce their communications policies by reading and potentially acting on cleartext domain names contained in SNI extensions of in-transit packets can no longer do so when ESNI is used because the domain names are encrypted.

Thus, enterprises need a way to use cleartext/plaintext domain names to protect their networks and enforce communications policies when enterprise hosts use ESNI when establishing TLS-secured communications.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Methods, devices, systems, and/or computer-readable media disclosed herein describe protecting enterprise networks from threats (e.g., Internet threats) and enforcing enterprise communications policies, for example, in some cases where domain names contained in in-transit packets are encrypted (e.g., encrypted Server Name Indication (eSNI) extensions in TLS handshake protocol messages, encrypted TLS protocol messages, etc.). Cybersecurity applications may detect an encrypted hostname in one or more packets. Based on detecting the encrypted hostname (e.g., domain name), the cybersecurity applications may resolve a plaintext hostname (e.g., domain name) corresponding to the encrypted hostname. The cybersecurity applications may use the plaintext hostname to determine whether the plaintext hostname is associated with any communications policies. For example, cyber security applications that protect networks from threats identified in reports (e.g., cyber threat intelligence reports) may use the plaintext hostname to determine whether the plaintext hostname is associated with one or more threat indicators. When the plaintext hostname is associated with one or more threat indicators, the cybersecurity applications may apply one or more packet-filtering rules to the one or more packets. By resolving a plaintext hostname from an encrypted hostname, the cybersecurity applications may, for example, protect enterprise networks from threats (e.g., Internet threats) and from privacy breaches such as malicious eavesdropping, enforce enterprise communications policies, and/or assist law enforcement.

There are many possible variants to the above process, some of which are detailed below in the Detailed Description section.

BRIEF DESCRIPTION OF THE DRAWINGS

The present disclosure is described by way of example and not limited in the accompanying figures in which like reference numerals indicate similar elements and in which:

FIG. 3 shows a representative eSNI Domain Name Correspondence List (EDCL) used by cybersecurity applications to determine correspondence between eSNI ciphertext and plaintext domain names.

DETAILED DESCRIPTION

Figure 1:
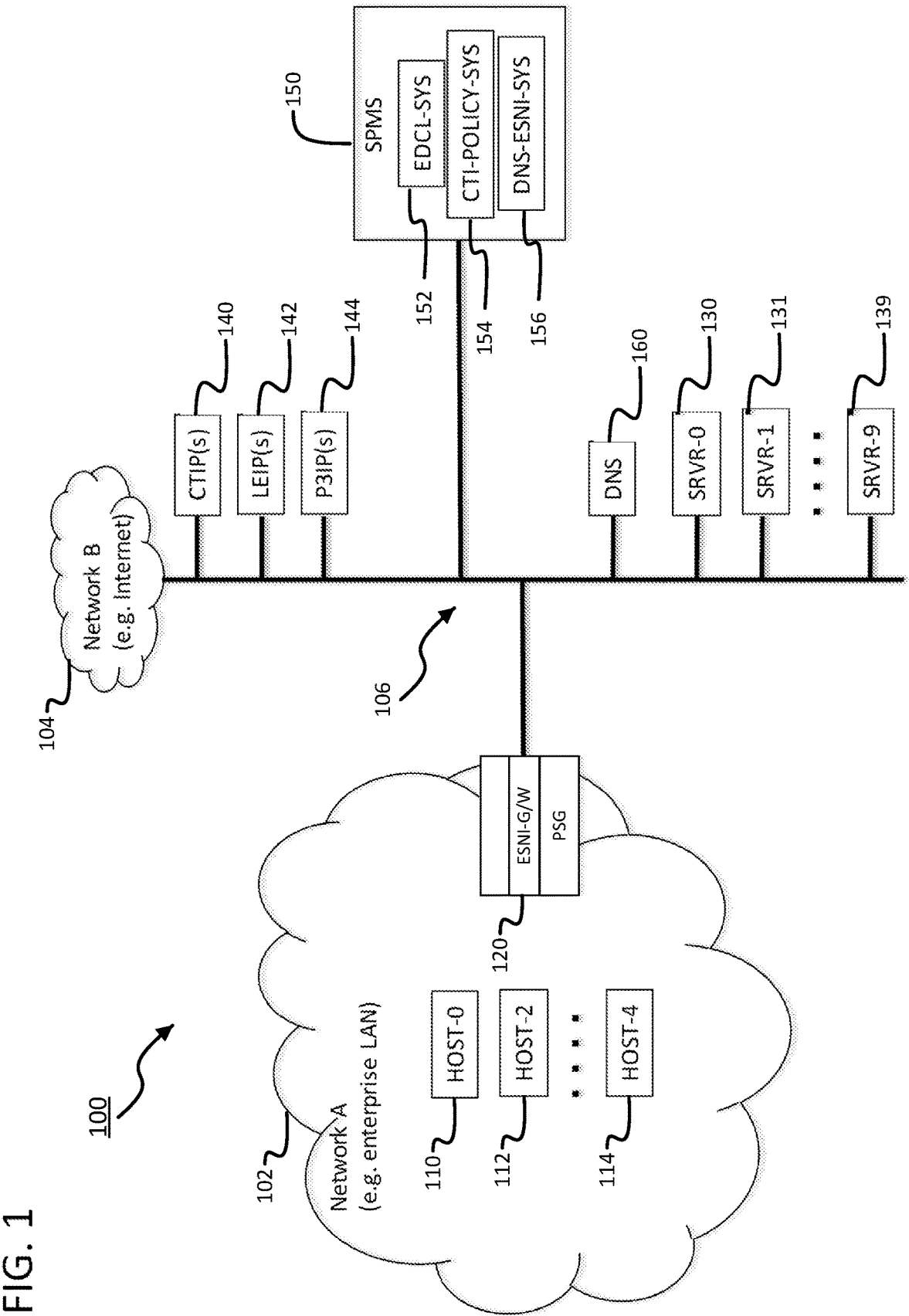
FIG. 1 shows an illustrative environment for a threat protection and policy enforcement system for TLS-secured communications and associated enterprise networks in accordance with one or more aspects of the disclosure.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure.

Various connections between elements are discussed in the following description. These connections are general and, unless specified otherwise, may be direct or indirect, wired or wireless, physical or logical (virtual/software-defined). Similarly, the network elements, such as hosts and appliances, may be physical or virtual. In this respect, the specification is not intended to be limiting.

The present disclosure describes techniques for cybersecurity applications acting on domain names contained in in-transit packets composing TLS-secured communications when the domain names may be encrypted. Some network cybersecurity applications enforce TCP/IP communications policies composed of packet-filtering rules that include plaintext domain names as rule-matching criteria. If domain names contained in in-transit packets are encrypted, for example, encrypted Server Name Indication (SNI) extension field values in TLS ClientHello messages, then the policies cannot be enforced. Additionally or alternatively, cybersecurity applications may selectively enforce encrypted SNI usage, for example, to thwart eavesdropping associated with cleartext domain names.

Throughout this specification, the term "domain name" may be used interchangeably with the network domain that is identified by the domain name. Context determines if "domain name" refers to the actual name, or identity, of a domain or if "domain name" refers to the domain itself. The interchangeability of this terminology would be appreciated by those skilled in the art. Also, "domain name" may be used interchangeably with hostname, fully qualified domain name (FQDN), etc., with the precise meaning defined by the context. For example, a domain name observed in a structured field of an in-transit L2/L3 packet may be an FQDN. Similarly, a domain name that is a CTI indicator may also be an FQDN.

As used herein, encrypted Server Name Indication ("eSNI") may generally refer to the technology and logic associated with encrypted SNI and not to a particular protocol, implementation, or standard. Further, "eSNI ciphertext" may generally refer to one or more encrypted portions (e.g., fields, values, etc.) of a message (e.g., TLS ClientHello message) associated with establishing a secure communication channel between two or more parties. The one or more encrypted portions may comprise the SNI value, as well as other portions of the message (e.g., ClientHello message), including, for example, the entire message (e.g., ClientHello message). Applicant recognizes that eSNI protocols are currently being developed by the Internet Engineering Task Force (IETF), and which portions of messages will be encrypted has not yet been finalized and/or become classified as part of a standard. One of ordinary skill in the art would recognize that the processes, methods, techniques, devices, apparatuses, and/or systems described herein may apply to detecting threats (e.g., Internet threats), protecting enterprise networks, mitigating privacy breaches, enforcing enterprise communications policies, and/or assisting law enforcement in communications comprising an encrypted Server Name Indication (eSNI), regardless of which portions of such communications are encrypted.

Aspects of this disclosure relate to methods, devices, systems, and/or computer-readable media for protecting enterprise networks from Internet threats and enforcing enterprise communications policies, for example, in cases where domain names contained in the communications' in-transit packets are encrypted. Applications, such as cybersecurity applications, operating in-line and/or in-transit packet filtering devices may detect when eSNI is being used to encrypt a domain name. Based on detecting the use of eSNI, the applications and/or in-transit packet filtering devices may determine the plaintext domain name corresponding to the eSNI ciphertext and enforce communications policies associated with the plaintext domain name.

Aspects of the disclosure may also describe methods, devices, systems, and/or computer-readable media for protecting enterprise networks from threats, such as malicious eavesdropping, and enforcing enterprise communications policies, for example, in cases where domain names contained in the communications are not encrypted. Cybersecurity applications operating in-line and/or in-transit packet filtering devices may detect when eSNI is not being used to encrypt a domain name. The cybersecurity applications and/or in-transit packet filtering devices may determine if eSNI is supported by the associated domain. If eSNI is supported, the cybersecurity applications operating in-line and/or in-transit packet filtering devices may enforce communications policies associated with transmitting cleartext domain names, for example, by causing the communications to use eSNI (when available).

The identification of communications that are associated with Internet threats may leverage databases of cyber threat intelligence (CTI) reports that are available from many CTI provider organizations. These CTI reports may include indicators, or threat indicators, or Indicators-of-Compromise (IoCs), that are unique identifiers of Internet hosts or Internet hosts' resources (e.g. services, application instances, and the like) that are associated with malicious activity. The CTI indicators may include Internet network addresses—in the form of IP addresses, 5-tuples (host/resource identifiers specifying L3 host IP addresses, L4 ports, and/or associated L3 protocol types), hostnames/domain names, URIs, and the like—of resources that may be controlled and/or operated by threat actors, or that otherwise may be associated with malicious activity. The CTI indicators may also include identifiers for certificates and associated certificate authorities that are used to secure some TCP/IP communications (e.g., X.509 certificates used by the TLS protocol to secure HTTP-mediated sessions). In addition to threat indicators, CTI reports may include additional information associated with the threat, such as the type of threat, threat attribution and threat actor(s), characteristic behaviors, attack targets, geographic and geo-political information, and the like.

The present disclosure may describe methods, devices, systems, and/or computer-readable media for deriving packet-filtering rules from domain name indicators received in the CTI. The present disclosure may also describe methods, devices, systems, and/or computer-readable media for enforcing the derived packet-filtering rules on packets comprising TLS-secured communications (e.g. HTTPS communications). In this regard, an enterprise may receive CTI indicators via a subscription to a cyber threat intelligence provider (CTIP). The enterprise may create policies composed of packet-filtering rules derived from the CTI indicators, configure packet filtering devices with the policies, and protect its enterprise networks from Internet threats by enforcing the policies on in-transit packets crossing the networks' boundaries.

The use of eSNI to encrypt domain names in TLS-secured communications may be realized via the joint participation of the communicating hosts and the Internet's Domain Name System (DNS). That is, a first host (e.g., an HTTP client, such as a web browser application executing on an enterprise host) and a second host (e.g., an Internet-attached HTTP server such as a web application server hosting a domain named www.web-domain-X.com) may support eSNI to establish a TLS-secured communication between the two hosts. The second host (e.g., the web server) may publish a public key in its associated DNS entry (e.g., www.web-domain-X.com). Clients may use the public key to encrypt, for example, the domain name (e.g., www.web-domain-X.com) contained in the SNI extension and other information (e.g., a ClientHello message, data and/or information in the ClientHello message, etc.). Before communicating with the second host (e.g., www.web-domain-X.com), the first host (e.g., the HTTP client) may issue a query to the DNS to obtain (e.g., retrieve, resolve) the IP address—for example, 12.34.56.78 of www.web-domain-X.com—and the eSNI public key of the second host. The first host (e.g., the HTTP client) may establish a TCP connection to a well-known port (e.g., port 443 (HTTPS)) of 12.34.56.78. The first host may use the public key to encrypt the FQDN (e.g., www.web-domain-X.com) contained in the SNI extension. In some examples, the public key may be used to encrypt other data in addition to the FQDN, such as the ClientHello message and/or data and information contained therein. After encrypting the FQDN, and any additional data, with the public key, the first host may insert the resulting eSNI ciphertext into a communication, such as a ClientHello message. The communication (e.g., the ClientHello message) may be encapsulated in a TCP packet with a destination port of 443. The TCP packet may be encapsulated in an IP packet with a destination IP address of 12.34.56.78. The IP packet may be sent (e.g., transmitted) to the second host (e.g., web server) via a connection (e.g., TCP connection). Upon receipt of the ClientHello message, the second host (e.g., web server) may use the private (e.g., secret) key associated with the public key to decrypt the ciphertext to obtain (e.g., determine) the plaintext domain (e.g., www.web-domain-X.com) of the second host (e.g., domain) that the first host (e.g., web browser) would like to communicate with.

An application operating a packet filtering device may derive (e.g., determine) a plaintext domain name from eSNI ciphertext by correlating the L3 destination IP address of the in-transit packet (e.g., containing the ClientHello message) with eSNI-related information. For example, a cybersecurity application operating a packet filtering device may correlate a cyber threat intelligence (CTI) database of domain name indicators with TCP/IP communications to identify potential threat communications and/or decide how to process the identified potential threat communications (e.g., block/drop or allow/forward the communications). The CTI database may contain a plurality of domain names and the content of the CTI database may be dynamic. That is, new entries (e.g., domain names and any associated information) may be added to the CTI database and existing entries may be deleted from the CTI database on a continual basis. The present disclosure describes packet filtering techniques that may be computationally efficient such that in-transit packets are not dropped because of overflowing buffers and network security is not compromised due to lag. The applications and/or in-line packet-filtering devices described herein may filter in-transit L2/L3 packets on a packet-by-packet basis. That is, an L2/L3-transparent device filters, or applies a packet-filtering rule to, each in-transit packet in arrival order (e.g., FIFO queueing) and determines each packet's disposition/action (e.g., block/drop, allow/forward, etc.) before filtering the next packet. It will be appreciated that communications, such as a ClientHello message, may be fragmented across several packets. Packet-by-packet processing, as described herein, may apply to communications, such as ClientHello messages, that are fragmented over a plurality packets.

An eSNI Domain Name Correspondence List (EDCL) may be generated from a CTI database of domain names. The EDCL may be a data structure. The data structure may be a data organization, management, and/or storage format that enables efficient access and/or modification. The data structure may be a collection of data values, the relationships among them, and/or the functions or operations that can be applied to the data. In some examples, the data structure may be a 2-D table comprising at least two (2) columns labeled {IP-address, cti-esni-domain-names-list} that is uniquely indexed by IP address. In other examples, the data structure may be a database. To generate the EDCL, a DNS may be queried for each domain name (e.g., fully qualified domain name (FQDN)) in the CTI database. The DNS query may determine at least one of the domain name's IP address and whether the associated domain supports eSNI. Determining whether the domain supports eSNI may comprise querying for a resource record that comprises an eSNI public key for encryption. If the associated domain supports eSNI, an entry (e.g., row) in the EDCL may be created and/or updated by placing the IP address in the IP-address column and the domain name in the cti-esni-domain-names-list column. Because of virtual domain technology, where multiple domain names may resolve to the same IP address, there may be multiple domain names, or a list of domain names, associated with each IP address in the EDCL. For exemplary purposes, assume for this summary example that there is only one domain name in the cti-esni-domain-names-list associated with an (unique) IP address in the EDCL. In order to process in-transit packets quickly to avoid buffer overflows and packet drops and to minimize packet transit latency, the EDCL may be organized as an efficient data structure, such as a hash table, to support fast searches indexed by IP address that check for the existence of EDCL entries and return the list of domain names associated with an IP address.

When an (in-line) packet filtering device inspects an in-transit packet that contains a ClientHello message with eSNI ciphertext, the packet filtering device may determine the plaintext domain name corresponding to the eSNI ciphertext by extracting the destination IP address from the L3 packet, and searching for the destination IP address in the EDCL. If the destination IP address is not found in the EDCL, then the cybersecurity application logic may decide to allow (e.g., forward) the packet towards its destination because there is no CTI-based threat associated with the packet. If the destination IP address is found in the EDCL, then the associated domain name may be the plaintext domain name corresponding to the eSNI ciphertext. To determine how to handle the packet, the cybersecurity application may search one or more network security policies comprising a plurality of in-transit packet-filtering rules (that are derived from the CTI database) for a rule with packet-matching criteria that corresponds to the plaintext domain name. A matching rule may indicate a packet disposition (e.g. allow/forward/pass or block/drop/deny). A matching rule may also indicate additional (network protective) actions, or packet transformation functions (PTFs), for the packet, such as log, capture, mirror/re-direct, forward-to-proxy, spoof-tcp-rst, and the like.

Multiple domain names may be associated with a single IP address in the EDCL. For example, domain hosting services often host many domains on a single IP address. Some of these many domains may be in a CTI database or other cybersecurity-related databases, such as privacy protection databases, law enforcement databases, corporate usage policy databases, etc. Additionally, some of these domains may support eSNI. The plaintext domain name corresponding to the eSNI ciphertext may not be unambiguously determined from the associated IP address in the EDCL. A cybersecurity application may select among several different actions to disambiguate the plaintext domain name and/or otherwise mitigate the potential threat. These actions may be based on augmented EDCL information, additional efficient data structures, TLS messages, and the like. For example, the cybersecurity application may: send a TCP RST to the client that tears down the TCP connection and terminates the TLS handshake session; send a TLS message (e.g., TLS alert protocol message with a "handshake failure" (code 40) alert) to the client that terminates the TLS handshake session; send a TLS message to the client that causes the client to use a TLS version (e.g., TLS v.1.2) that does not support eSNI; send a TLS message to the client that causes the client to send a plaintext SNI instead of an encrypted SNI; etc.

The application that operates the packet filtering device may inspect the in-transit packet containing the ClientHello message, determine that eSNI is being used, and determine that the packet's L3 destination IP address is in the EDCL. The eSNI ciphertext may correspond to a (plaintext) domain name of interest, such as one contained in a CTI database. There are several actions that the application may take to disambiguate the plaintext domain name and/or otherwise mitigate the threat. For example, the application may drop the packet containing the ClientHello message and spoof, or (transparently) proxy for, the intended host of the ClientHello message.

Additionally or alternatively, the security application may forward the ClientHello message to a (transparent) intermediary TLS Man-In-The-Middle (MITM) proxy function. The MITM proxy function may decrypt a TLS-secured application session, examine the session in the clear, re-encrypt the session, and forward the TLS-secured session toward its destination. While the MITM proxy function may not be able to decrypt the eSNI ciphertext, the MITM proxy function may inspect (e.g., examine) the decrypted application session and extract a plaintext domain name that corresponds to the eSNI ciphertext from the session's contents. For example, an HTTPS session may be decrypted by the MITM proxy function to expose the cleartext HTTP session. In this regard, HTTP method requests, such as GET, POST, PUT, etc., may include domain names. The security application may extract plaintext domain names from the cleartext and filter the plaintext domain names through any policies being enforced by the packet filtering device.

In another example, the security application may operate, or otherwise have access to, a system DNS-QUERY-TRACKER that may be used to disambiguate plaintext domain names corresponding to eSNI values. The DNS-QUERY-TRACKER system may monitor DNS queries that originated from enterprise hosts that may also originate TLS sessions that pass through the packet filtering device. The DNS-QUERY-TRACKER system may store records of data associated with any DNS queries for domain names that support eSNI, for example, in a table (e.g., hash table) and/or database. Each record may include the IP address of the host that originated the DNS query, the domain name, the domain name's resolved IP address, and/or the query time. The DNS-QUERY-TRACKER system may provide an interface to the table and/or database that stores the records with a function call that accepts an IP address as input and returns one or more records corresponding to the input IP address. In some examples, the DNS-QUERY-TRACKER may be configured to account for the use of encrypted DNS protocols, such as DNS Queries over HTTPS (DoH) (e.g., RFC 8484) and/or DNS over Transport Layer Security (DoT) (e.g., RFC 7858). These protocols may encrypt DNS communications, such as DNS query requests and/or replies. That is, the configuration may be such that a DNS-QUERY-TRACKER system may access the plaintext and/or cleartext of DoH and DoT communications.

Prior to initiating a TLS-secured session (e.g., HTTPS communication) associated with a domain name, an enterprise host may issue a DNS query to resolve the domain name to an IP address and obtain (e.g., retrieve, acquire) the domain's public key (e.g., eSNI public key). As noted above, the public key may be used to encrypt the domain name and other data and/or information included in a ClientHello message. If there is a public key (e.g., eSNI public key), the DNS-QUERY-TRACKER system may insert a record of the public key (e.g., eSNI public key) in its table and/or database. A packet filtering device may receive an L3 packet comprising a ClientHello message with eSNI ciphertext. The security application executing on the packet filtering device may extract the destination IP address from the packet and query the DNS-QUERY-TRACKER for one or more records indexed by the destination IP address. The query may be time-limited. That is, the record may have been created and/or updated within a predetermined time of receiving the L3 packet. A record that is time-correlated with the ClientHello message and/or matches the origin host IP address with the L3 packet's source IP address may contain a plaintext domain name associated with the eSNI ciphertext. The security application may filter the plaintext domain name through any policies being enforced by the packet filtering device. The DNS-QUERY-TRACKING systems and methods described above may be used in conjunction with, or as an alternative to, the EDCL-based systems and methods for estimating plaintext domain names corresponding to eSNI ciphertext.

In some instances, the EDCL may be generated from a database of domain names that may be relevant to an application. For example, the database may be a collection of domain names for which law enforcement (LE) has authorization to intercept, decrypt, and store the plaintext of associated communications sessions (e.g., HTTPS sessions) for a lawful intercept application. Since law enforcement may not be authorized to intercept, decrypt, and/or store sessions that are not associated with the domain names, an EDCL may be generated from a lawful intercept database of domain names to determine if the session may be associated with a plaintext domain name in the lawful intercept database. If the session is associated with a domain name in the lawful intercept database, then the application may take the appropriate action (e.g., intercept, decrypt, and store the plaintext of the associated communications).

In a privacy protection & preservation (P3) application, the database may be a collection of domain names associated with encrypted communications sessions (e.g., HTTPS sessions) that shall not be decrypted and stored to protect and preserve privacy. When a TLS-secured session uses eSNI, an EDCL may be generated from the P3 database of domain names to determine if the session is associated with a plaintext domain name in the P3 database. If the domain name is associated with a domain name in the P3 database, then the application may take appropriate actions to ensure that the session is not decrypted and/or stored.

In some examples, enterprises may seek to enforce an eSNI usage policy that mitigates and/or prevents eavesdropping by malicious actors. The eSNI usage policy enforcement may be used in conjunction with the EDCL-based eSNI security function and/or DNS-QUERY-TRACKER-based security function described above. In addition to having access to an EDCL, the application may have access to, for example, a data structure named DNS-ESNI that comprises one or more elements of the domain names registered in the DNS with associated domains that support eSNI. For example, the application operating the packet filtering device may detect a ClientHello message with an SNI value (e.g., a (cleartext) domain name) that is not in the CTI database but has an entry in the DNS-ESNI data structure. The domain name is being sent in the clear when it could be sent as ciphertext. Additionally or alternatively, the application may query DNS to resolve the domain name and determine if the domain supports eSNI. Based on the response to the query, the application may determine if the domain name is an element, or member, of an abstract or actual DNS-ESNI data structure. If the application determines that the domain supports eSNI, the application may drop the packet containing the ClientHello message (with the cleartext domain name), spoof/transparently proxy for the host that the ClientHello message is being sent to, and/or send a TLS message to the client that causes the client to use an encrypted SNI instead of a plaintext SNI.

In some examples, enterprises may seek to enforce an eSNI usage policy that implements eSNI for TLS sessions. That is, enterprise hosts may only access domains that support eSNI. The application operating the packet filtering device may enforce such a policy, for example, by detecting a ClientHello message with an SNI value (e.g., a plaintext domain name, that is not an element of DNS-ESNI) and sending a TLS message to the client that terminates the TLS handshake session and/or sending a TCP RST message to the client that terminates the associated TCP session. The filtering rules and/or the enforcement policies described herein may find application in a system that performs rule-based network-threat detection, for example, using the techniques disclosed by the Applicant in U.S. application Ser. No. 14/757,638, entitled "Rule-Based Network-Threat Detection for Encrypted Communications" and filed on Dec. 23, 2015 (now U.S. Pat. No. 9,917,856), the entirety of which is incorporated herein by reference.

FIG. 1 shows a system 100 for eSNI filtering for cybersecurity applications. System 100 may include Network A 102 and Network B 104, which may be connected by one or more network links 106 providing internetwork access and/or interconnection. System 100 may also include one or more hosts. As used herein, "host" (or "hosts") refers to any type of network device or node or computing device connected to a network, with an L3 network address assigned to their network interfaces. The one or more hosts may be computing devices and/or network devices, such as, servers, desktop computers, laptop computers, tablet computers, mobile devices, smartphones, routers, gateways, proxies, firewalls, switches, access points, or the like. In some examples, some computing devices may have network interfaces without network addresses, such as the PSG/ESNI G/W 120. The computing devices without network addresses may not be considered hosts. A network interface without an assigned network address may be considered to be "transparent" with respect to the network level (e.g., L3 and/or L2).

Network A 102 may comprise one or more networks (e.g., Local Area Networks (LANs), Wide Area Networks (WANs), Virtual Private Networks (VPNs), Software-Defined Networks (SDNs), or combinations thereof) associated with one or more individuals and/or entities (e.g., governments, corporations, service providers, and the like). Network B 104 may comprise one or more networks (e.g., LANs, WANs, VPNs, SDNs, or combinations thereof) that interface and/or interconnect Network A 102 with one or more other networks (not illustrated). For example, Network B 104 may comprise the Internet, or a similar network, and/or portions thereof.

As shown in FIG. 1, network A 102 may comprise hosts 110, 112, and/or 114 and one or more packet filtering network gateway devices, such as a packet security gateway (PSG). Hosts 110, 112, and/or 114 may be configured to function as TLS clients and/or TLS tunnel terminals. The PSG may comprise an eSNI-Gateway (ESNI-G/W) 120 function for processing in-transit packets associated with TLS-secured communications that may use eSNI. In some embodiments, the eSNI-Gateway network devices (e.g., ESNI-G/W 120 or their incorporating PSGs) may not have L3 network addresses and/or L2 network addresses assigned to their network interfaces that ingress and/or egress the in-transit packets to which the eSNI-Gateway functions. The eSNI Gateways (and incorporating PSGs) may be L3-transparent.

Similarly, Network B 104 may include, or provide network access to, hosts 130, 131, and/or 139. Hosts 130, 131, and/or 139 may be configured to function as TLS servers and/or TLS tunnel terminals. Hosts 130, 131, and/or 139 may host one or more domains, and may register the associated domain names with a DNS (e.g. DNS 160). Hosts 130, 131, and/or 139 may also associate eSNI support for the domains on the Internet DNS (e.g., create a resource record for a domain that includes an eSNI public key for encryption). Network B 104 may also include, or provide network access to, systems 140, 142, and/or 144. Systems 140, 142, and/or 144 may be collections of networked hosts configured to provide various services. For example, CTIP(s) 140 may be one or more CTI providers (CTIPs) that provide CTI reports that include network threat indicators (e.g. domain names) to subscribers (such as SPMS 150). Similarly, law enforcement intelligence providers (LEIP(s)) 142 and protection & preservation intelligence providers (P3IPs) 144 may provide intelligence reports, which include network indicators (e.g., domain names), to subscribers (such as Security Policy Management Server (SPMS) 150). Intelligence providers (not shown) for other applications in addition to CTI, LE, and P3 applications may also provide intelligence reports including network indicators in the form of domain names to subscribers.

Security Policy Management Server (SPMS) 150 may be a system that creates and distributes policies comprising one or more packet-filtering rules. The one or more packet-filtering rules may be derived from CTI supplied by CTIPs 140, from LEI supplied by LEIPs 142, from P3I supplied by P3IPs 144, and the like. These policies may be distributed to subscribers, such as ESNI-G/W 120. SPMS 150 may also be a system that creates and distributes data to subscribing eSNI-Gateways (e.g. ESNI-G/W 120) that support eSNI-Gateway functions. For example, EDCL-SYS 152 may represent a module, device, system, or subsystem of SPMS 150 that creates and distributes EDCLs derived from domain name indicators included in CTI, LEI, P3I, and/or the like to subscribing eSNI-Gateways ESNI-G/W 120. In another example, CTI-POLICY-SYS 154 may be a module, device, system, or subsystem of SPMS 150 that creates policies comprising one or more packet-filtering rules derived from CTI indicators (including domain name indicators). In yet another example, DNS-ESNI-SYS 156 may represent a module, device, system, or subsystem of SPMS 150 that creates and distributes set data structures (e.g., tables, databases, etc. and associated functions) containing DNS-registered domain names of domains that support eSNI. For example, a law enforcement policy creation system (e.g., LEI-POLICY-SYS (not shown)) associated with law enforcement applications, a privacy policy creation system (e.g., P3I-POLICY-SYS (not shown)) associated with P3 applications, and other policy creation systems may be similar to CTI-POLICY-SYS 154, but different in the sources and/or types of intelligence, which may include domain name indicators.

Domain Name Server (DNS) 160 may be one or more computers that comprise the Internet Domain Name System (DNS). DNS 160 may be used by various hosts to resolve domain names into IP addresses. Additionally or alternatively, DNS 160 may be used to obtain (e.g., retrieve, acquire) encryption keys (e.g., public encryption keys) for use in creating eSNI ciphertext included in TLS ClientHello messages.

ESNI-G/W 120 may be located at or near a network boundary that interfaces between a first network (e.g., Network A 102) and a second network (e.g., Network B 104). For example, ESNI-G/W 120 may connect (e.g., interface) network 102, or one or more hosts located therein, with network 104, or one or more hosts located therein. As discussed above, network B 104 may include hosts 130, 131, and/or 139. Hosts 130, 131, and/or 139 may host one or more networked application servers and/or associated domains. The one or more application servers and/or associated domains may be configured to support TLS-secured communications. Network A 102 may include hosts 110, 112, and/or 114. Hosts 110, 112, and/or 114 may host network application clients (e.g., web browsers) and may be configured to support TLS-secured communications. ESNI-G/W 120 may be inserted in-line on network link 106 and may filter in-transit packets in order to enforce policies associated with domain names associated with TLS-secured communications. In some embodiments, the ESNI-G/W 120 may be a subcomponent or subfunction of a more general packet filtering gateway system, such as a Packet Security Gateway (PSG), for enforcing policies on all TCP/IP packet communications between hosts associated with Network A 102 and hosts associated with Network B 104. A PSG may be an interface between a protected network, such as Network A 102, and unprotected networks connected to the protected network, such as Network B 104. One or more PSGs may be located at the one or more boundaries of the protected network and filter (e.g., apply policies comprised of packet-filtering rules to) in-transit packets traversing the one or more boundaries in either direction. As shown in FIG. 1, a PSG may incorporate ESNI-G/W 120. The ESNI-G/W 120 function of a PSG may apply to one or more packets associated with TLS-secured communications using eSNI.

Although not shown, it will be appreciated that additional network components may be present in FIG. 1. These network components may include devices, such as network firewalls and associated network address translation (NAT) functions, proxies, and the like, located at, or near, network boundaries that may alter packet header information. Altering packet header information may impact the methods, devices, systems, and/or computer-readable media described herein. As will be described in greater detail below, the systems, components, functions, data, and the like described in relation to the CTI-based application may be applied to other applications, such as law enforcement (LE) applications, privacy protection & preservation (P3) applications, and the like. These applications (e.g., LE applications, P3 applications, etc.) may be substituted for and/or operated concurrently with the CTI-based network protection application. The methods, devices, systems, and/or computer-readable media described herein may be implemented in any suitable system that may determine the correspondence between eSNI ciphertext contained in in-transit TLS ClientHello messages/packets and plaintext/cleartext domain names that are associated with the applications and communications. Based on the determination of a correspondence between eSNI ciphertext and a plaintext domain name, the system may handle the packets according to a packet-filtering rules.

Figure 2:
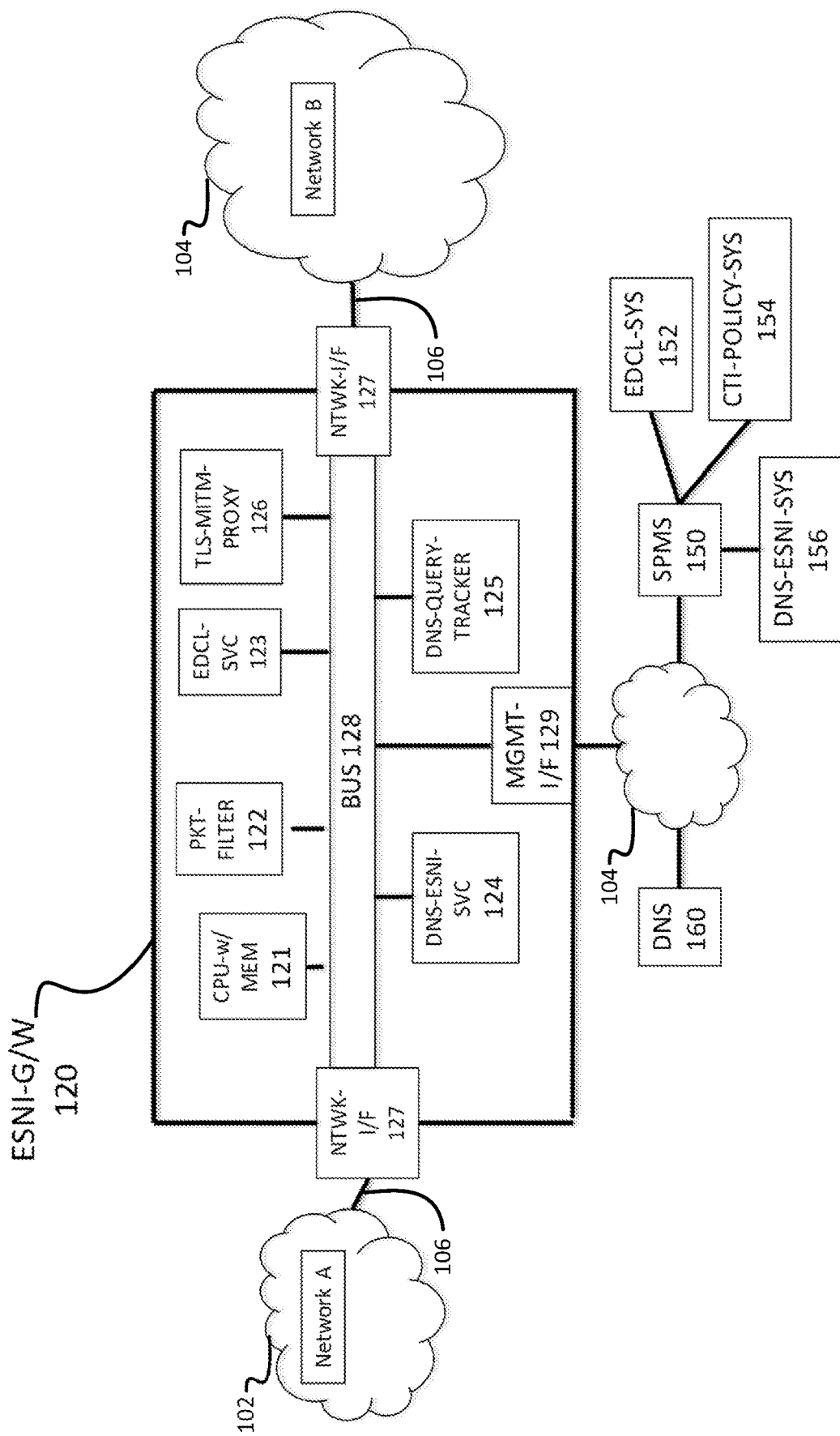
FIG. 2 shows an illustrative efficient eSNI packet filtering gateway for executing cybersecurity applications in accordance with one or more aspects of the disclosure.

FIG. 2 shows an example of an ESNI-G/W 120 for enforcing policies on communications between Network A 102 and a Network B 104. The communications may be TLS-secured communications with an encrypted hostname (e.g., an encrypted SNI value that may be included in eSNI ciphertext). ESNI-G/W 120 may comprise a processor and main memory (CPU-w/MEM) 121, which may execute logic for configuring and operating ESNI-G/W 120, network interfaces NTWK-I/F 127, a management interface MGMT-I/F 129. The CPU-w/MEM 121 may execute logic for configuring and operating the ESNI-G/W 120 in accordance with one or more communications policy enforcement applications. These applications may be executed concurrently and co-operatively/collaboratively. Additionally or alternatively, a processor and main memory (CPU-w/MEM) 121 may execute logic for configuring and operating a collection of systems and services, such as PKT-FILTER 122, EDCL-SVC 123, DNS-ESNI-SVC 124, DNS-QUERY-TRACKER 125, and/or TLS-MITM-PROXY 126, which may support operation of ESNI-G/W 120 and its associated applications. These components may communicate using BUS 128. BUS 128 may be used to transfer data, including packets, between the components of ESNI-G/W 120. BUS 128 may provide a data communications channel between the components of ESNI-G/W 120. In some examples, BUS 128 may be an on-chip silicon bus connecting processor logic (e.g., a processor and main memory (CPU-w/MEM) 121) with on-chip cache memory, which provides fast and compact processing. Additionally or alternatively, BUS 128 may be a network connection (e.g., a TCP/IP network), such as Network A 102 or Network B 104. In further examples, BUS 128 may comprise an integrated/embedded data bus on a printed circuit board (PCB), a parallel data cable connecting computers and/or peripheral devices, a serial optical cable connecting ports and/or interfaces of network switches and routers, an L2/L3 switched network, L3 routed network, etc., and any combination thereof. BUS 128 may be silicon, wired, wireless, physical, logical, virtual, software-defined, etc.

ESNI-G/W 120 may be located in-line with network link 106, which may interconnect Network A 102 and Network B 104 via network interface ports NTWK-I/F 127. In some embodiments, network interface ports NTWK-I/F 127 may be transparent at L3 and/or L2. That is, network interface ports NTWK-I/F 127 may not have IP addresses and/or MAC addresses assigned to them. According to these examples, in-transit L2/L3 packets may pass through ESNI-G/W 120 without modifying L2/L3 packet headers. The ESNI-G/W 120 in-transit packet processing logic may provide time-efficient and memory-efficient packet processing that allows packet filtering at the peak packet transmission rate of Link 106 without dropping packets, for example, due to internal buffer overflows due to latency. In some examples, management interface MGMT-I/F 129 may be assigned an L3/IP address. The management interface MGMT-I/F 129 may allow ESNI-G/W 120 to communicate with hosts providing services, such as SPMS 150 and/or DNS 160.

The PKT-FILTER 122 system may apply policies comprising one or more packet-filtering rules to in-transit packets traversing the ESNI-G/W 120. The policies may be supplied by servers and/or services, such as the SPMS 150. A policy's packet-filtering rules may be derived from indicators included in various types of intelligence reports, for example, CTI reports, LEI reports, P3I reports, and the like. PKT-FILTER 122 may be configured to concurrently support one or more different cybersecurity applications, such as CTI-based network protection, lawful intercept, privacy protection & preservation, and the like.

The EDCL-SVC 123 service may manage queries for information associated with one or more EDCLs. The EDCLs may be provided (via MGMT-I/F 129) by EDCL-SYS 152. EDCL-SYS 152 may be part of SPMS 150. EDCL-SVC 123 may service queries from ESNI-G/W 120.

EDCL-SVC 123 may receive one or more query requests from one or more applications executing on ESNI-G/W 120. The one or more query requests may be received via BUS 128. A query request may include an IP address. EDCL-SVC 123 may transmit query responses to the applications. A query response may include ESNI-related information associated with the IP address stored in one or more EDCLs managed by EDCL-SVC 123.

The DNS-ESNI-SVC 124 service may manage queries for eSNI support information associated with domain names that may be registered in the Internet DNS 160. EDCL-SVC 123 may receive one or more query requests from one or more applications executing on ESNI-G/W 120. The query requests may be received via BUS 128. A query request may comprise a domain name. EDCL-SVC 123 may transmit query responses to the one or more applications. A query response may include information that indicates whether the domain associated with the domain name supports eSNI. The DNS-ESNI-SVC 124 may determine whether the domain name supports eSNI by determining whether the domain name is a member of a DNS-ESNI set managed by the DNS-ESNI-SVC. A DNS-ESNI set may be provided, for example by DNS-ESNI-SYS 156 via MGMT-I/F 129. DNS-ESNI-SYS 156 may be a component of SPMS 150. Additionally or alternatively, the DNS-ESNI-SVC 124 may determine whether the domain name supports eSNI by querying the DNS 160 to determine if the domain name is associated with any resource records for eSNI support.

The DNS-QUERY-TRACKER 125 system may manage information associated with DNS queries that may have been issued by hosts connected to Network A 102. Additionally or alternatively, the DNS-QUERY-TRACKER 125 system may service queries for information associated with DNS queries that may have been issued by hosts connected to Network A 102. The DNS-QUERY-TRACKER 125 may observe DNS query requests and responses for resolving domain names into IP addresses. For each DNS query, DNS-QUERY-TRACKER 125 may store, in an efficient data structure—such as a table (e.g., hash table) or database—a record for the query. The record may include: (1) the IP address of the host that originated the DNS query; (2) the domain name; (3) the domain name's resolved IP address; (4) the query time(s); and/or (5) additional information for managing and/or improving the system and/or service. For example, the additional information may comprise eSNI-support information associated with the domain name. The DNS-QUERY-TRACKER 125 may help disambiguate plaintext domain names that may correspond to eSNI ciphertext. For example, an eSNI-Gateway application may process an in-transit packet that contains a ClientHello message comprising eSNI ciphertext. The application may query EDCL-SVC 123 and determine that multiple domain names may correspond to the eSNI ciphertext. To disambiguate which of the multiple domain names may correspond to the eSNI ciphertext, the application may query DNS-QUERY-TRACKER 125 for records that correspond to the packet's L3 source IP address and/or L3 destination IP address. To service the query, DNS-QUERY-TRACKER 125 may search its data structure (e.g., table and/or database) for one or more records that match either the packet's source IP address with the record's origin host IP address and/or the packet's destination IP address with the record's resolved IP address. Any such records may be included in the query response sent to the application. The application may then determine a plaintext domain name corresponding to the eSNI ciphertext from the most recent record. Based on the determined plaintext domain name, the application may send the packet and domain name to PKT-FILTER 122 for filtering and handling.

The TLS-MITM-PROXY 126 (transparent) proxy system may be used by an eSNI-Gateway application to perform a deeper inspection of the packet and/or associated communication. For example, TLS-MITM-PROXY 126 may decrypt the TLS-secured communications, examine the plaintext of the TLS-secured communications, and re-encrypt the TLS-secured communications. The application may determine the plaintext domain name(s) corresponding to eSNI ciphertext associated with a TLS-secured communication using this Man-in-The-Middle approach. For example, the application may receive an in-transit packet containing an encrypted hostname (e.g., a ClientHello message that includes eSNI ciphertext). To determine if there is correspondence between a plaintext domain name associated with the application and the eSNI ciphertext, the application may invoke the EDCL-SVC 123 and/or the DNS-QUERY-TRACKER 125. However, the EDCL-SVC 123 and/or the DNS-QUERY-TRACKER 125 may not determine the plaintext domain name corresponding to the encrypted hostname (e.g., domain name). In some examples, the EDCL-SVC 123 and/or the DNS-QUERY-TRACKER 125 may not be able to determine the plaintext domain name within a certain degree of certainty. The application may then forward the TLS-secured communication to the TLS-MITM-PROXY 126. The TLS-MITM-PROXY 126 may decrypt the TLS-secured communications to obtain (e.g., determine) plaintext domain names that correspond to the eSNI ciphertext. As will be discussed in greater detail below, one or more ESNI-G/W applications, such as LE and P3 applications, may use the TLS-MITM-PROXY 126 to acquire the plaintext of TLS-secured communications sessions.

FIG. 3 shows a representative example of an eSNI Domain Name Correspondence List (EDCL) 300. The EDCL data structure may be represented as a two-dimensional table. EDCL 300 may be used by an eSNI Gateway (e.g., ESNI-G/W 120) to determine if an encrypted hostname (e.g., eSNI ciphertext) corresponds to a plaintext domain name in a database of domain names associated with cybersecurity applications, such as CTI-based network protection, law enforcement (LE), privacy protection & preservation (P3), and the like. The determination of whether an encrypted hostname (e.g., encrypted domain name) corresponds to one or more plaintext domain names in the database may be a factor for how an eSNI-Gateway (e.g., ESNI-G/W 120) handles an in-transit packet comprising an encrypted domain name (e.g., a ClientHello message with eSNI ciphertext). As discussed herein, EDCL 300 may be used with one or more cybersecurity applications associated with CTI-based network protection, as well as one or more applications like law enforcement (LE) applications and/or privacy protection & preservation (P3) applications.

The EDCL 300 may comprise a plurality of columns. A first column 301, labeled "IP-Address," may contain one or more unique IP addresses that index each row and/or entry of the table. Each IP address in first column 301 may correspond to a DNS record (e.g., Internet DNS A (IPv4) or AAAA (IPv6)) for one or more domain names in the CTI database that are associated with domains that support eSNI. The second column 302, labeled "CTI-ESNI-Domains," may contain domain names in the CTI database that support eSNI. Elements in the second column 302 are the name(s) of the domain(s) hosted at the corresponding IP address in first column 301. For example, the domains {pgorlzex.cn, x-advice.onln, bmb27.com} in the (311, 302) element location of EDCL 300 may be hosted at the IP address 40.07.25.13, as shown by the (311, 301) element location. For example, if an ESNI-G/W 120 detects an encrypted hostname (e.g., eSNI ciphertext in a ClientHello message) and the associated packet's L3 destination IP address is 40.07.25.13, the EDCL 300 may indicate that one of the plaintext domain names {pgorlzex.cn, x-advice.onln, bmb27.com} may correspond to the encrypted hostname (e.g., eSNI ciphertext). There may be additional domains hosted at the same IP address 40.07.25.13 with domain names that may correspond to the eSNI ciphertext. However, those domains names may not be listed at element (311, 302) because the domain names are either not in the CTI database or do not support eSNI.

The remaining columns in the EDCL 300 are illustrative and may be used by ESNI-G/W 120 for decision support on how to handle a packet containing an encrypted hostname (e.g., a ClientHello message with eSNI ciphertext). A third column 303, labelled "#CTI-ESNI-Domains," may include a count of the domain names in the second column 302, "CTI-ESNI-Domains." For example, the three (3) domain names represented in element (311, 302), may define element (311, 303) as 3. A fourth column 304, labelled "#CTI-Domains," may include a count of the domain names in the CTI database that are hosted at the corresponding IP address in first column 301. For example, element (313, 304) may be 15, which means that 15 domain names in the CTI database are hosted at IP address 6203:7400:3340::8618:46ef (e.g., element (313, 301)). While 15 domain names may be hosted at IP address 6203:7400:3340::8618:46ef, there are six (6) domains in the CTI database that are hosted at IP address 6203:7400:3340::8618:46ef that do not support eSNI. This may be indicated at element (313, 303), which may indicate the number of domain names that support eSNI at a given IP address. A fifth column 305, labelled "#Reverse-IP-Lookup-Domains," may include a count of all domains hosted by the IP address according to a reverse IP lookup service. In some embodiments, there may be additional columns in EDCL 300 that ESNI-G/W 120 may use for decision support.

As shown by the example illustrated in row 314, ESNI-G/W 120 may receive a communication with an encrypted hostname (e.g., a ClientHello message with eSNI ciphertext). ESNI-G/W 120 may use a network address (e.g., source IP address, destination IP address, etc.) to determine, with a high degree of probability, a plaintext domain name corresponding to a received eSNI ciphertext. As shown, ESNI-G/W 120 may determine that the plaintext domain associated with the received eSNI ciphertext is toplipts.com. In this regard, ESNI-G/W 120 may query EDCL 300 using IP address 22.74.02.18 to determine a plaintext domain name corresponding to the eSNI ciphertext. ESNI-G/W 120 logic may decide that since #CTI-ESNI-Domains (314, 303)=1 and #CTI-Domains (314, 304)=1 and #Reverse-IP-Lookup-Domains (314, 305)=1, then (314, 302)=toplipts.com, the received encrypted hostname (e.g., eSNI ciphertext) corresponds to toplipts.com.

In another example, ESNI-G/W 120 may receive a communication with an encrypted hostname (e.g., a ClientHello message with eSNI ciphertext). ESNI-G/W 120 may use a network address (e.g., source IP address, destination IP address, etc.) to determine that additional methods may be necessary to determine the plaintext domain name corresponding to the encrypted hostname. As shown in the example illustrated by Row 312, ESNI-G/W 120 may query EDCL 300 using IP address 14.99.65.22 to determine one or more plaintext domain names corresponding to the encrypted hostname (e.g., eSNI ciphertext). ESNI-G/W 120 logic may decide that since #CTI-ESNI-Domains (312, 303)=5 and #CTI-Domains (312, 304)=5 and #Reverse-IP-Lookup-Domains (312, 305)=20, then ESNI-G/W 120 may determine that the domains hosted at IP address 14.99.65.22 support eSNI. Additionally, ESNI-G/W 120 may determine that the plaintext domain name corresponding to the eSNI ciphertext is likely not in the CTI database. In this regard, ESNI-G/W 120 may decide to use additional methods to determine the plaintext domain name corresponding to the encrypted hostname (e.g., eSNI ciphertext).

As shown by the example illustrated in row 310, ESNI-G/W 120 may receive a communication with an encrypted hostname (e.g., a ClientHello message with eSNI ciphertext). ESNI-G/W 120 may use a network address (e.g., source IP address, destination IP address, etc.) to determine that the communication may be malicious. ESNI-G/W 120 may query EDCL 300 using IP address 102.2.18.81 to determine one or more plaintext domain names associated with the encrypted hostname (e.g., eSNI ciphertext). ESNI-G/W 120 logic may decide that since #CTI-ESNI-Domains (310, 303)=8 and #CTI-Domains (310, 304)=8 and #Reverse-IP-Lookup-Domains (310, 305)=0, then ESNI-G/W 120 may determine that the IP address has been assigned to malicious actors that have taken measures and actions to obfuscate their Internet presence. Based on this determination, ESNI-G/W 120 may determine that the communication is most likely malicious.

As shown by the example illustrated in row 311, ESNI-G/W 120 may receive a communication with an encrypted hostname (e.g., a ClientHello message with eSNI ciphertext). ESNI-G/W 120 may use a network address (e.g., source IP address, destination IP address, etc.) to determine that the communication may be malicious. ESNI-G/W 120 may query EDCL 300 using IP address 40.07.25.13 to determine one or more plaintext domain names associated with an encrypted hostname (e.g., eSNI ciphertext). ESNI-G/W 120 logic may decide that since #CTI-ESNI-Domains (311, 303)=3 and #CTI-Domains (311, 304)=3 and #Reverse-IP-Lookup-Domains (311, 305)=3, then ESNI-G/W 120 may determine that the communication is directed to an IP address that has been assigned to a content delivery and/or adware service operator that does not aggressively vet or monitor its clients. The ESNI-G/W 120 may determine that the communication is most likely malicious.

Figure 4A:
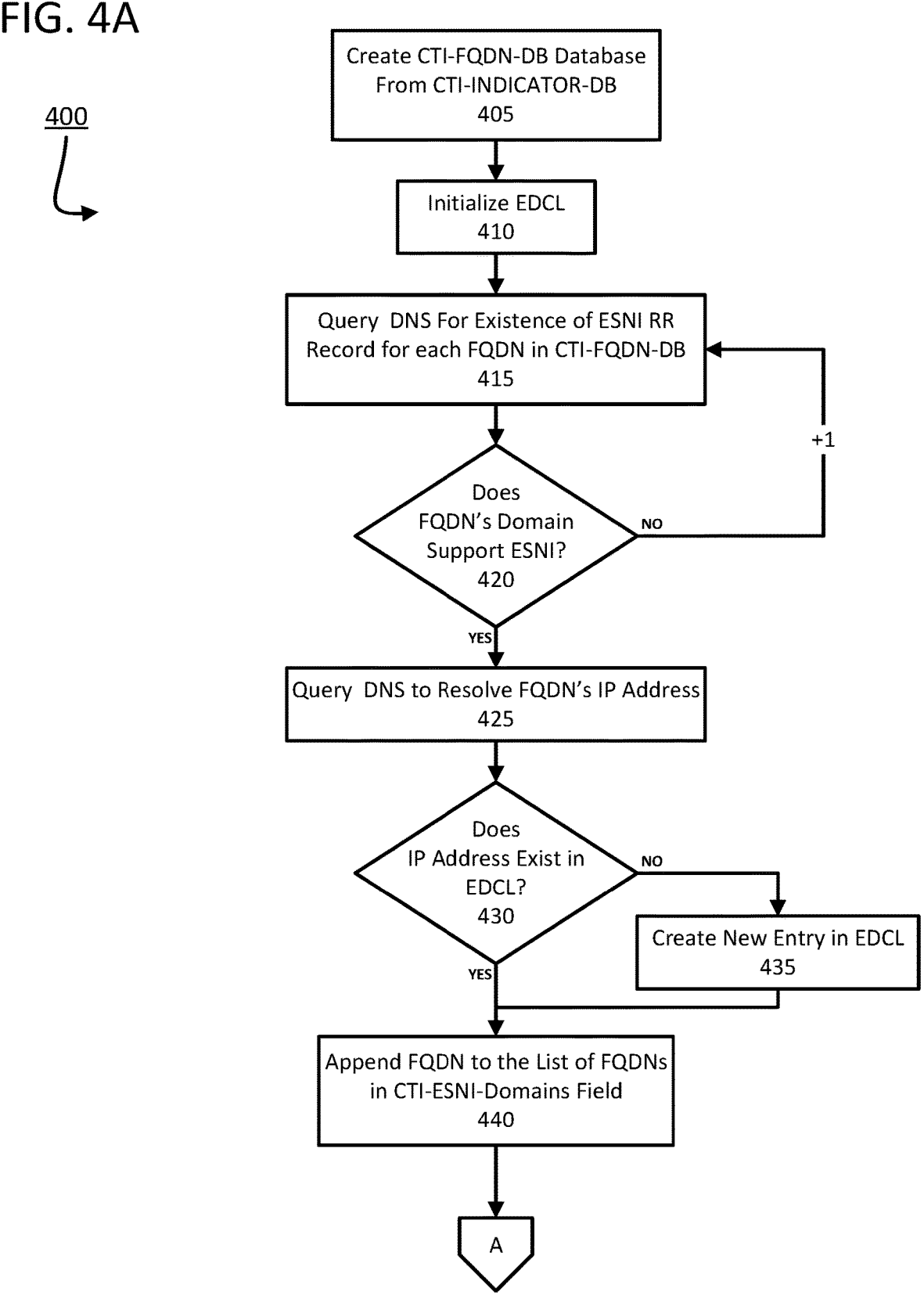
FIGS. 4A and 4B show a flowchart of an exemplary process for creating, distributing, and maintaining EDCLs.
Figure 4B:
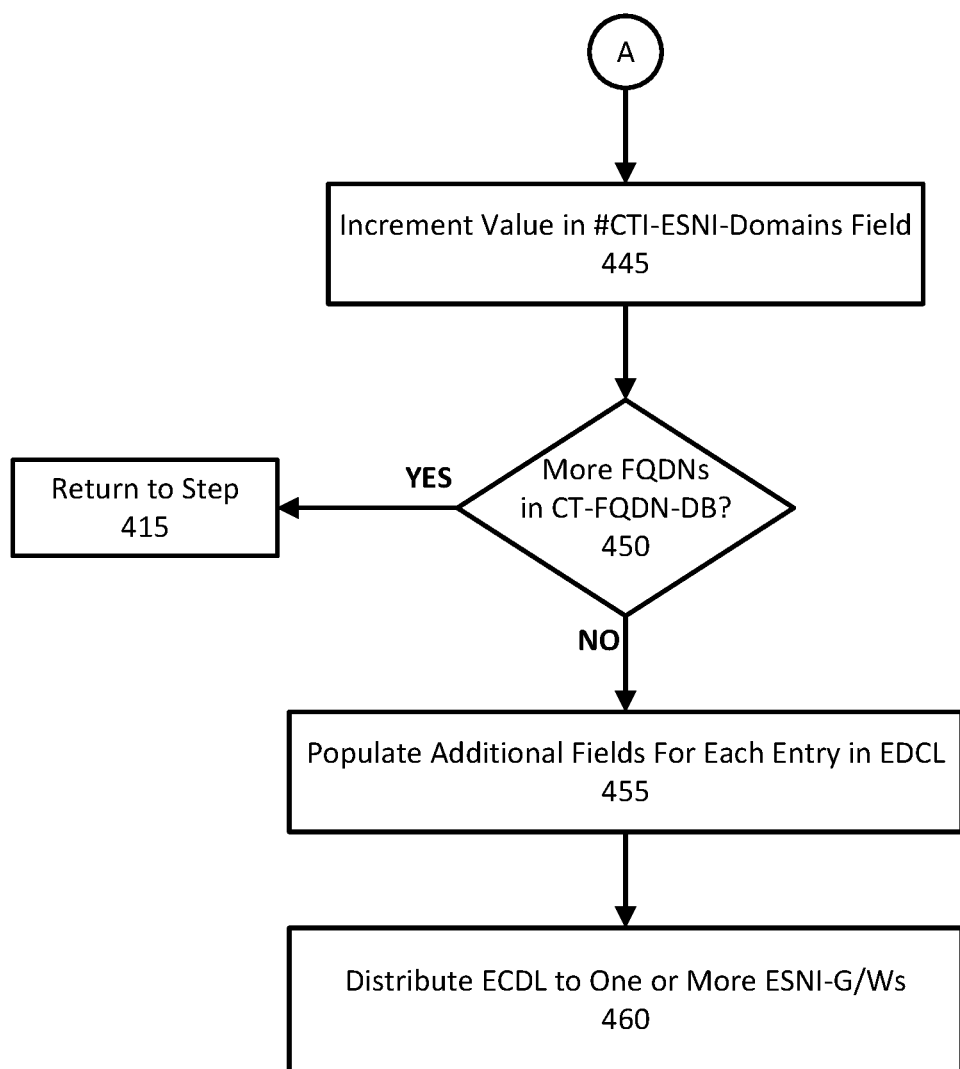

FIGS. 4A and 4B show an example of a process 400 of a system (e.g., EDCL-SYS 152) that creates, distributes, and maintains EDCLs. In some embodiments, the system (e.g., EDCL-SYS 152) may be integrated with, or comprise a subsystem of, the SPMS 150 that creates, distributes, and maintains policies of packet-filtering rules derived from CTI databases and/or other intelligence databases. CTI databases may include a plurality of threat indicators, including a plurality of threat indicators in the form of domain names. Additionally, the CTI databases may be updated continually, for example, by cyber threat intelligence providers (e.g., CTIP(s) 140) producing new threat intelligence reports and/or associated network threat indicators. CTI-derived policies and EDCLs may be created and/or managed by individual eSNI-Gateways. Additionally or alternatively, EDCLs and/or CTI-derived security policies may be created and/or managed by centralized servers, such as CTIPs.

At step 405, the system (e.g. EDCL-SYS 152) creates a database (e.g., CTI-FQDN-DB) by accessing a current CTI indicator database (e.g., CTI-INDICATOR-DB) of SPMS 150, extracting the fully qualified domain names (FQDNs) from the current CTI indicator database (e.g., CTI-INDICATOR-DB), and inserting the FQDNs into the database (e.g., CTI-FQDN-DB). In step 410, the system may initialize the EDCL, which may be associated with metadata including creation time, SPMS identity, CTI-INDICATOR-DB and CTI-FQDN-DB identifiable information, and the like. Once the EDCL is initialized, the system may initiate a looping, or iterative, process through each FQDN in CTI-FQDN-DB, to populate the EDCL.

In step 415, the system may query DNS (e.g., Internet DNS 160) to determine whether the current FQDN has a resource record (RR) associated with eSNI. At step 420, the system may determine whether the resource record indicates whether the associated domain supports eSNI. If the resource record indicates that the associated domain does not support eSNI, then process 400 returns to step 415 to query the DNS for the next entry in the CTI-FQDN-DB. However, if the resource record indicates that the associated domain supports eSNI, then process 400 proceeds to step 425, during which the system may query the DNS for the domain record (e.g., resp. A and AAAA record) of the FQDN. The system may receive a response. The response may include the IPv4 IP address and/or the IPv6 IP address associated with the FQDN. In some examples, if both an A (IPv4) and AAAA (IPv6) record exists for the FQDN, then step 425 may be repeated if the domain name has both an IPv4 IP address and an IPv6 IP address.

In step 430, the system may determine whether the IP address exists in the EDCL. For example, the system may search for the record/row/entry indexed by the IP address. If an entry does not exist, then the system creates a new record in the EDCL in step 435. The entry may be indexed by the IP address.

After creating a new entry for the IP address or discovering that an entry already exists, the system may append the FQDN to the list of FQDNs in the CTI-ESNI-Domains 302 field in step 440. In step 445, the system may increment the #CTI-ESNI-Domains 303 field to indicate the new IP address associated with the entry. In step 450, the system may determine whether there are more FQDNs to process in the CTI-FQDN-DB. If there are more FQDNs to process, process 400 returns to step 415 to repeat the process with the next FQDN in CTI-FQDN-DB. If there are no more FQDNs, process 400 proceeds to step 455.

In step 455, the system may populate additional fields and/or columns in the EDCL. The additional fields and/or columns may be in addition to IP-Address 301, CTI-ESNI-Domains 302, and #CTI-ESNI-Domains 303. Continuing an example discussed above with respect to FIG. 3, row 313 may be indexed by IP address 6203:7400:3340::8618:46ef in element (313, 301). Row 313 may have nine (9) domain names (the value of element (313, 303) that are in the CTI database and are associated with domains that support eSNI. Element (313, 305)=15 is the number of domains hosted at IP address 6203:7400:3340::8618:46ef, according to some Reverse-IP-Lookup service. In step 460, the system (e.g., SPMS 150) may distribute the EDCL to one or more ESNI-G/Ws (e.g., ESNI-G/W 120). In some examples, ESNI-G/Ws may have a subscription to receive the EDCL. Process 400 may be repeated to change, modify, alter, or otherwise update the EDCL.

Process 400 may be performed in a different order and/or in different combinations than as described above. The dynamics of CTI, eSNI support, and/or mappings of domain names to IP addresses suggest that process 400 may be performed often, or even continually, in order to minimize lag and/or synchronization issues. In this regard, process 400 may use a continual dynamic update model. Additionally or alternatively, process 400 may use batch processing to update EDCL. While process 400 was described in terms of a cybersecurity application for CTI-based network protection, it will be appreciated that other applications, such as lawful intercept and privacy protection & preservation applications, may be use process 400 to update an EDCL, or an equivalent thereof.

Figure 5:
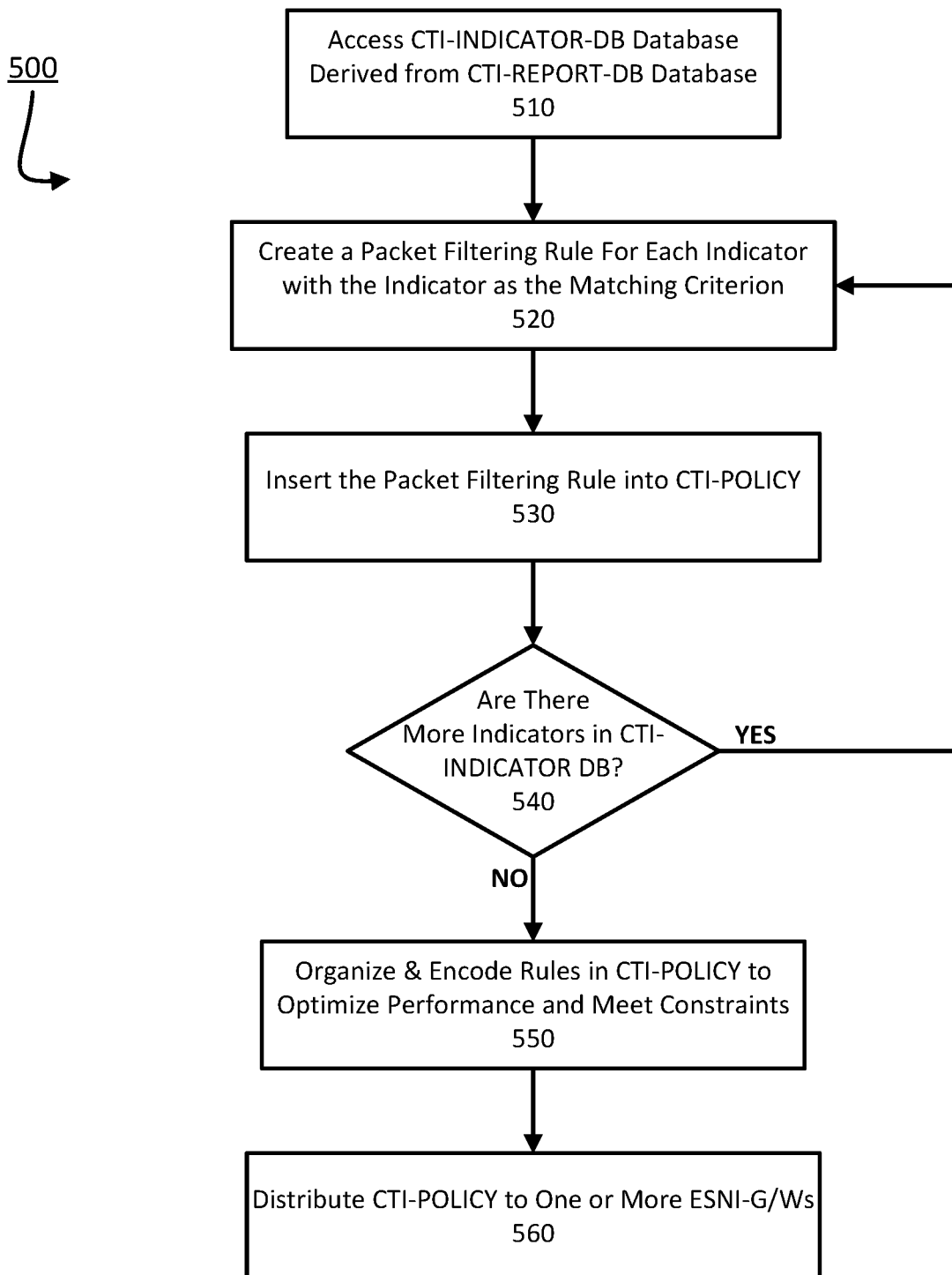
FIG. 5 shows a flowchart of an exemplary process for creating, distributing, and maintaining policies composed of packet-filtering rules derived from CTI databases.

FIG. 5 shows an example of a process 500 of a system (e.g., CTI-POLICY-SYS 154) that creates, distributes, and maintains policies comprising one or more packet-filtering rules derived from CTI databases. CTI-based policies may be distributed to packet security gateways (PSGs) that are located at network boundaries and that apply the policies to one or more packets crossing the boundary in either direction. When PSGs are configured with CTI-derived policies such as the policies created by a CTI-POLICY-SYS 156, then the PSGs may be identified as threat intelligence gateways (TIGs). ESNI-G/W 120 may be a subsystem, subcomponent, or subfunction of a TIG that is tasked with filtering only packets associated with TLS-secured communications or TLS-secured communications that use eSNI. PKT-FILTER 122, which may be used by the ESNI-G/W 120 to filter packets against plaintext domain names corresponding to eSNI ciphertext, may be used by the TIG, or PSG, to filter packets based on one or more CTI-derived indicators (e.g., IP addresses, 5-tuples, domain names, URIs, and the like). The policies created by a CTI-POLICY-SYS 154 may be used directly, commonly, and concurrently by ESNI-G/Ws 120 and the systems that integrate ESNI-G/W 120, such as TIGs and/or PSGs. In some examples, the system (e.g., CTI-POLICY-SYS 154) may be integrated with, or comprise a subsystem of, the SPMS 150 that creates, distributes, and/or maintains policies derived from CTI databases.

In step 510, the system may initiate the CTI-POLICY creation process by accessing the current CTI indicator database CTI-INDICATOR-DB of SPMS 150. It will be appreciated that the system may be adapted for other applications (e.g., law enforcement, privacy protection & preservation, etc.) and the databases associated therewith. Once the CTI-POLICY is initialized, the system may initiate a looping, or iterative, process through each indicator in CTI-INDICATOR-DB to create the CTI-POLICY.

In step 520, the system may create a packet-filtering rule with the current indicator as the matching criteria. In step 530, the system may insert the rule into CTI-POLICY. In terms of a typical packet-filtering rule syntax, such as OpenBSD PF syntax, the rule may specify at least one action and at least one packet matching criterion. The action, or disposition, may comprise allowing (e.g., passing, forwarding, etc.) the packet (e.g. in-transit L2/L3 packet) to its intended destination. Alternatively, the action may comprise blocking (e.g., denying, dropping, etc.) the packet (e.g. in-transit L2/L3 packet) from reaching its intended destination. The packet-matching criteria may comprise L3, L4, and/or application-layer packet field values that correspond to the CTI indicators (e.g., IP addresses, 5-tuples, hostnames/FQDNs, URIs, and the like). Depending on the capabilities and purposes (e.g., network security) of the target packet filtering devices (e.g., the PSGs, TIGs, and ESNI-G/Ws), additional rule components may be specified. These rule components may comprise such as: packet transformation functions (PTFs) and metadata. The PTFs may comprise logging, capturing, mirroring, re-directing, tunneling, and the like. Additionally or alternatively, the PTFs may comprise proxy functions. For example, a PTF "tcp-rst" may transparently spoof the TCP packet's destination host by creating and forwarding a TCP RST packet toward the source host that causes the source host to drop the TCP connection. Metadata may be used to inform the application logic of the packet filtering device and/or gateway of properties associated with the packet that cannot be derived directly from the contents of the packet. Metadata may include, for example, information derived from the associated CTI reports for the indicator, the CTI provider that supplied the indicator, the type of attack associated with the indicator, attribution, etc.

In step 540, the system may determine whether there are more indicators in CTI-INDICATOR-DB. If there are more indicators in the CTI-INDICATOR-DB, the process returns to step 520 to process the additional indicators in the CTI-INDICATOR-DB. If there are no additional indicators in the CTI-INDICATOR-DB, process 500 proceeds to step 550, wherein the system may organize rules in the CTI-POLICY. Additionally or alternatively, the system may encode the rules in the CTI-POLICY to meet constraints and/or improve performance of the packet filtering application (executed by a PSG/TIG/ESNI-G/W) that applies CTI-POLICY to in-transit packets. For example, duplicate rules may be removed, rules may be merged, and/or order dependencies may be identified. Additionally, rules may be re-ordered and/or grouped and ordered to support fast search by the packet-filtering application. Step 550 may be performed by the target packet filtering device/gateway. In some examples, step 550 and step 530 may be combined. In step 560, the system (e.g., SPMS 150) may distribute CTI-POLICY to one or more subscribing ESNI-G/Ws 120. Process 500 may be repeated to change, modify, alter, or otherwise update the CTI-POLICY.

Process 500 may be performed in a different order and/or in different combinations than as described above. The dynamics of CTI suggest that process 500 be performed often, or even continually, in order to minimize lag and/or synchronization issues. In this regard, process 500 may use a continual dynamic update model. Additionally or alternatively, process 500 may use batch processing to update CTI-POLICY. While process 500 was described in terms of a cybersecurity application for CTI-based network protection, it will be appreciated that other applications, such as lawful intercept and privacy protection & preservation applications, may be use process 500 to update an CTI-POLICY, or an equivalent thereof.

Figure 6:
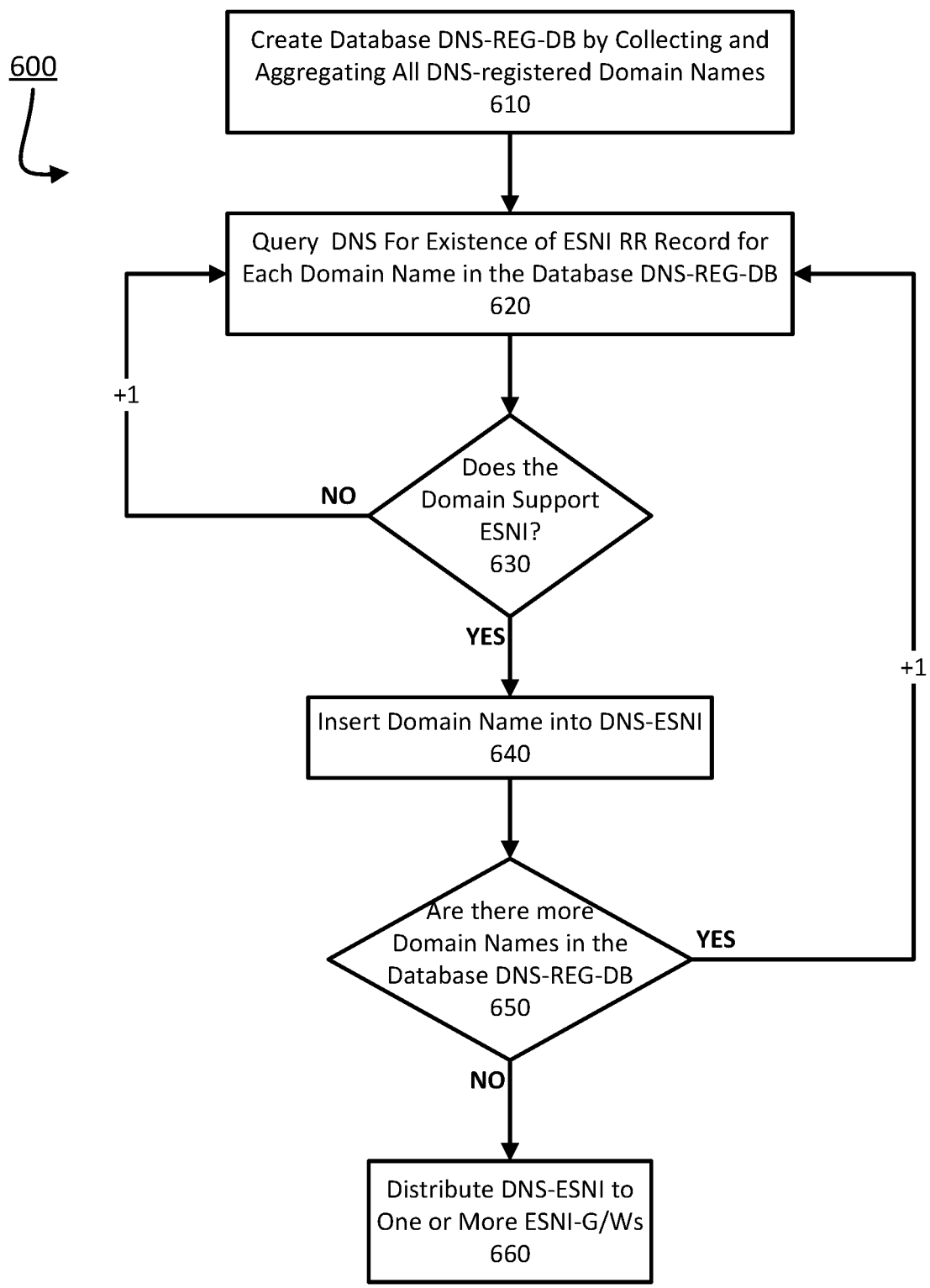
FIG. 6 shows a flowchart of an exemplary process for creating, distributing, and maintaining DNS-ESNI set data structures containing elements that are DNS-registered domain names that support eSNI.

FIG. 6 shows an example of a process 600 of a system (e.g., DNS-ESNI-SYS 156) that creates, distributes, and maintains DNS-ESNI set data structures. In some examples, the DNS-ESNI-SYS 156 system may be integrated with, or comprise a subsystem of, the SPMS 150 that creates, distributes, and maintains policies of packet-filtering rules derived from CTI databases. The DNS-ESNI set data structures may comprise entries for DNS-registered domain names that support eSNI. A DNS-ESNI data structure may determine whether a domain name registered in the Internet DNS is associated with a domain that supports eSNI. DNS-ESNI sets may be derived from dynamic databases comprising registered domain names in the Internet DNS, as well as from dynamic eSNI support information derived from querying the DNS for eSNI support status on registered domain names. ESNI-G/Ws may create and/or maintain a DNS-ESNI. Additionally or alternatively, a centralized approach, for example, via a SPMS (e.g., SPMS 150), may be employed to create and/or manage DNS-ESNI.

The DNS-ESNI set data structure may be a Bloom filter (B/F), a Cuckoo filter (C/F), and/or any suitable set data structure. These types of filters may efficiently store the elements of a data set, insert elements into the data set, and determine if an element is a member of a set. In particular, Cuckoo filters may support time-efficient deletion, or removal, of an element from a set. It will be appreciated that similar set data structures with properties similar to those of Bloom filters or Cuckoo filters may be used.

In step 610, the system (e.g., DNS-ESNI-SYS 156) may generate a database (e.g., DNS-REG-DB) by collecting and/or aggregating lists of domain names registered in the DNS. Sources of these lists include, for example, zone files discovered by DNS registry operator organizations and/or associated delegates and/or authoritative name servers, domain list aggregator services, $3^{rd}$-party services that discover country code domains (CCDs), ICANN, and the like. Once the DNS-registered domain names are obtained (e.g., determined), the system may initiate a looping, or iterative, process to generate the DNS-ESNI.

In step 620, the system may query the DNS (e.g., Internet DNS 160) for the existence of an eSNI resource record (RR) for each domain in the database DNS-REG-DB. The RR may indicate that the associated domain supports eSNI. In step 630, the system may determine if the RR associated with eSNI exists for the current domain name. If the system determines that the domain does not support eSNI, process 600 returns to step 620 where the DNS is queried for the next domain name entry in the database DNS-REG-DB. If the system determines that the domain supports eSNI, then the system may insert the domain name into the set DNS-ESNI, in step 640. In step 650, the system may determine if there are more domain names to process in DNS-REG-DB. If there are, process 600 returns to step 620 to process the next entry in DNS-REG-DB. If there are no more domain names, then the system proceeds to step 660, wherein the system (e.g., SPMS 150) may distribute DNS-ESNI to one or more subscribing ESNI-G/Ws 120. Process 600 may be repeated to change, modify, alter, or otherwise update the DNS-ESNI.

Process 600 may be performed in a different order and/or in different combinations than as described above. The dynamics of DNS and eSNI indicate that process 600 may be performed often, or even continually, in order to minimize lag and/or synchronization issues. In this regard, process 600 may use a continual dynamic update model. In some examples, an ESNI-G/W (e.g., ESNI-G/W 120) may determine the information contained in a DNS-ESNI on an as-needed basis by directly querying the DNS for eSNI support status when it observes a cleartext SNI contained in an in-transit packet.

Figure 7:
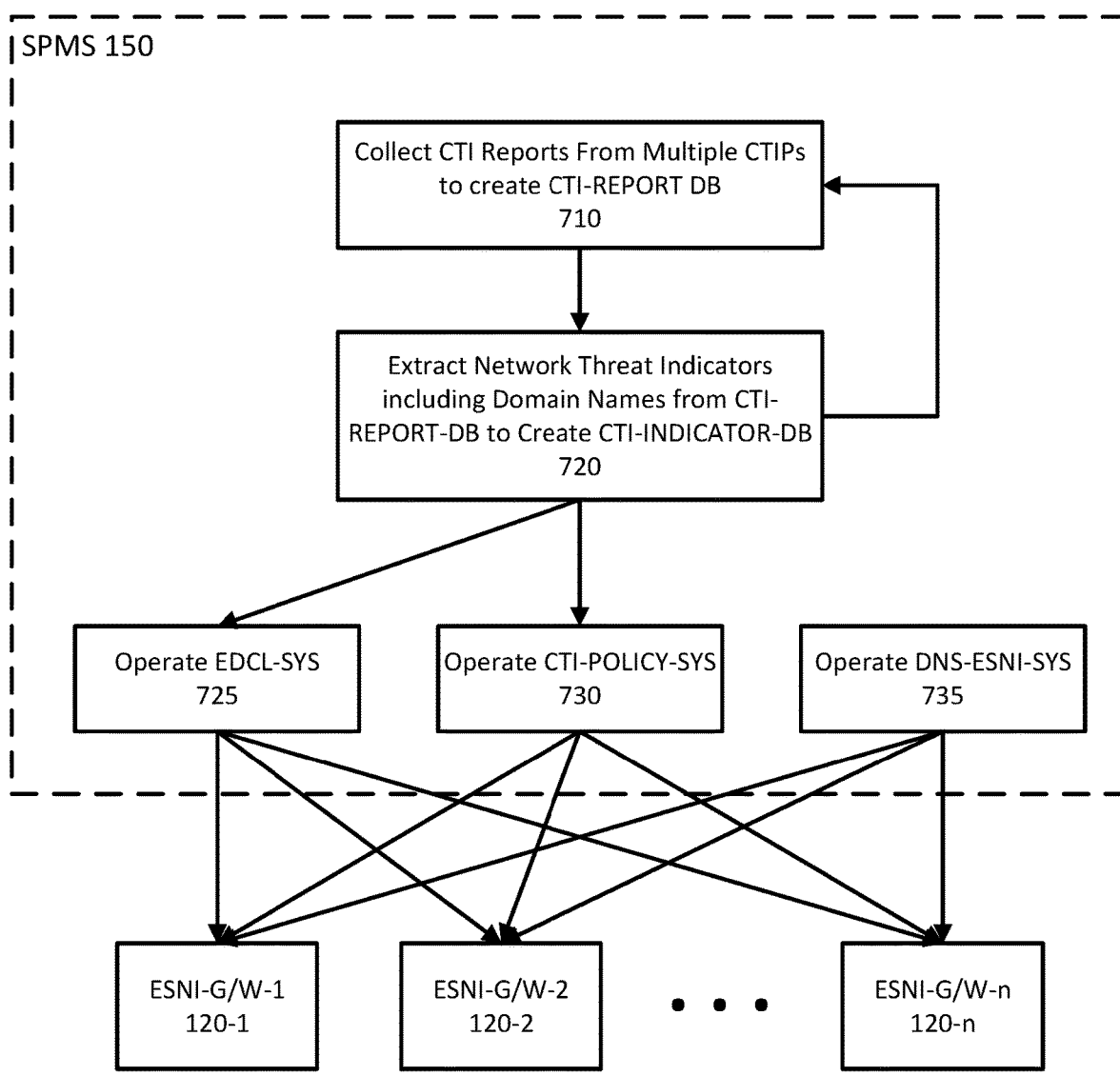
FIG. 7 shows a flowchart of an exemplary process for creating, distributing, and maintaining EDCLs, CTI-derived policies, and DNS-ESNI set data structures.

FIG. 7 shows an example of a process 700 of a system (e.g., SPMS 150) that creates, distributes, and maintains EDCLs, CTI-derived policies, and/or DNS-ESNI set data structures. While the examples describe below are related to CTI-based network protection applications, it will be appreciated that the systems and methods described below may be incorporated into SPMS 150 operation and/or associated ESNI-G/W operation.

In step 710, the system (e.g., SPMS 150) may collect CTI reports from multiple CTI Providers 140 and creates a database (e.g., CTI-REPORT-DB) of these reports. A CTI report may contain one or more network threat indicators in the form of IP addresses, 5-tuples, domain names, URIs, and the like. The threat indicators may identify network hosts and/or resources associated with a threat, as well as additional information associated with the threat, such as the threat attack type, attribution, etc. CTI reports may include network threat indicators that indicate domain names that may be threats.

In step 720, the system (e.g., SPMS 150) may extract the network threat indicators from the reports in CTI-REPORT- DB to create the database CTI-INDICATOR-DB. CTI-INDICATOR-DB may be the input, for example, described above in steps 405 and 510. CTI Providers may create new and/or update existing CTI reports. In this regard, the system (e.g., SPMS 150) may return to step 710 after completing step 720.

In step 725, the system (e.g., SPMS 150) may operate EDCL-SYS 152. In step 730 the system (e.g., SPMS 150) may operate CTI-POLICY-SYS 154. In step 735, the system (e.g., SPMS 150) may operate DNS-ESNI-SYS 156. Steps 725, 730, and/or 735 may operate concurrently. In step 725, the system may distribute EDCL-SYS 152 to one or more subscribing ESNI-G/Ws 120 via the MGMT-I/F 129. In step 730, the system may distribute CTI-POLICY to one or more subscribing ESNI-G/Ws 120 via the MGMT-I/F 129. In step 735, the system may distribute DNS-ESNI to one or more subscribing ESNI-G/Ws 120 via the MGMT-I/F 129. Each of the one or more subscribing ESNI-G/Ws may receive the EDCL, CTI-POLICY, and DNS-ESNI and transfer the data (e.g., via BUS 128) to EDCL-SVC 123, PKT-FILTER 122, and DNS-ESNI-SVC 124, respectively.

Figure 8A:
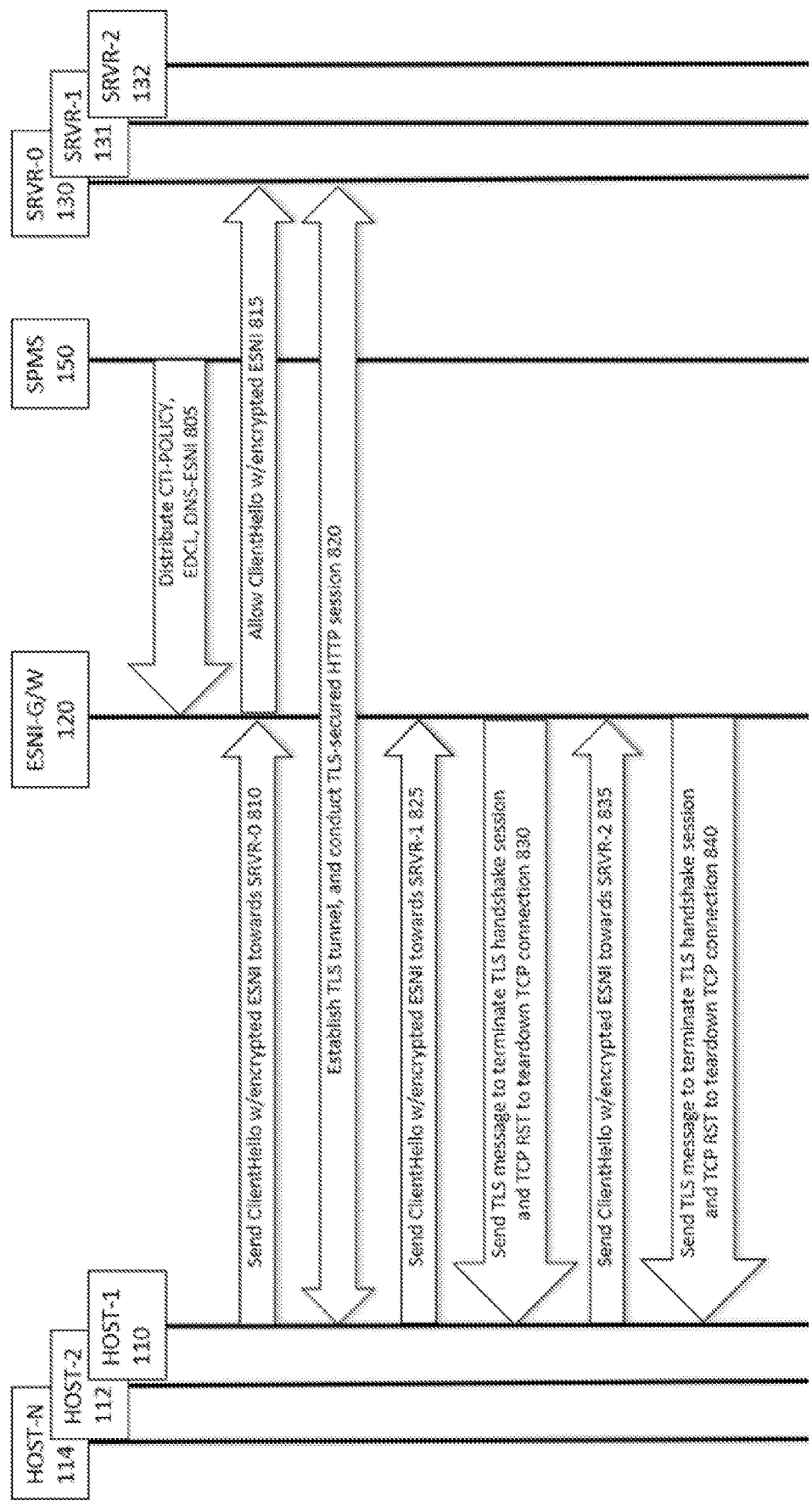
FIGS. 8A and 8B show a method for configuring and operating efficient eSNI gateways in accordance with one or more examples described herein.
Figure 8B:
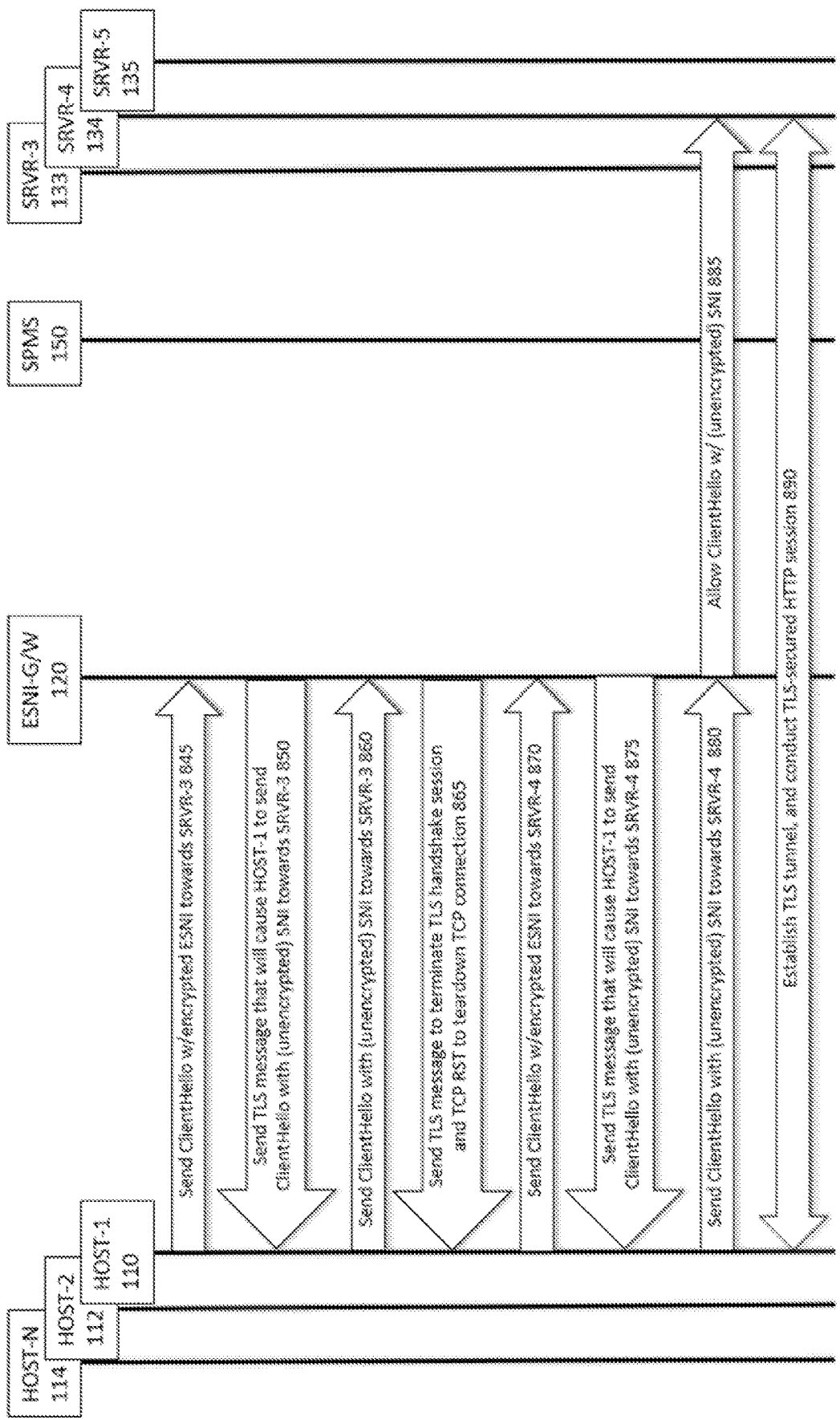

FIGS. 8A and 8B show an example of a process for configuring ESNI-G/W 120 with one or more packet filtering policies and an EDCL and executing a network threat protection application based on the one or more packet filtering policies and EDCL derived from one or more CTI indicators.

In step 805, the SPMS 150 may distribute at least one of a CTI-derived packet filtering policy (e.g., CTI-POLICY) and an associated CTI-derived EDCL to ESNI-G/W 120. SPMS 150 may also distribute DNS-ESNI to ESNI-G/W 120. Based on at least one of the CTI-derived packet filtering policy (e.g., CTI-POLICY), the associated CTI-derived EDCL, and/or the DNS-ESNI, ESNI-G/W 120 may configure its PKT-FILTER 122, EDCL-SVC 123, and/or DNS-ESNI-SVC 124.

In step 810, the user of a web browser executing on HOST-1 110 may attempt to access site SRVR-0 130. SRVR-0 130 may host a domain (e.g., www.legitimate-non-CTI-site.net) that supports eSNI. That is, the DNS entry for the domain may include a public encryption key. The user may enter the domain as part of a URI (e.g., https://www.legitimate-non-CTI-site.net/) in a browser window. The browser may query DNS 160 for the IP address of the domain (e.g., www.legitimate-non-CTI-site.net). In response to the query, the browser may receive the IP address (e.g., 87.65.43.21) and a public encryption key (e.g., SITE-0-KEY). In some examples, the DNS query may be captured by a DNS-QUERY-TRACKER 125 instance (not shown). After receiving the IP address and the public encryption key, the browser may establish a TCP connection with port 443 (HTTPS) of 87.65.43.21. To establish the TLS-secured session, the browser may generate a ClientHello message, encrypt the domain name and/or other portions of the message using the SITE-0-KEY key, encapsulate the message in a TCP packet and an IP packet PKT-0 with the (L3/IP) destination IP address field set to 87.65.43.21, and forward the packet PKT-0 towards SRVR-0 130.

In step 815, ESNI-G/W 120 may intercept the packet PKT-0. The ESNI-G/W 120 may examine the ClientHello message and determine that the message includes an encrypted hostname (e.g., eSNI ciphertext). In response to detecting the encrypted hostname (e.g., encrypted domain name), ESNI-G/W 120 may extract the (L3/IP) destination IP address (e.g., 87.65.43.21) from PKT-0 and search the EDCL for an entry indexed by 87.65.43.21 by querying the EDCL-SVC 123. If the search returns no results, ESNI-G/W 120 may determine that the plaintext domain name (e.g., www.legitimate-non-CTI-site.net) is not associated with any domain name threat indicator in the associated policy CTI-POLICY. The ESNI-G/W 120 may make this determination even though it does not know the plaintext domain name corresponding to the encrypted hostname (e.g., encrypted domain name). At the conclusion of step 815, ESNI-G/W 120 may allow PKT-0 to proceed towards its destination 87.65.43.21 (SRVR-0 130). In step 820, a TLS tunnel between HOST-1 110 and SRVR-0 130 may be established, and a (TLS-secured) HTTP session (e.g. HTTPS) is conducted. Upon completion of the HTTP session, the TLS tunnel and the TCP connection may be torn down.

In step 825, the user of the web browser executing on HOST-1 110 may attempt to access site SRVR-1 131. SRVR-1 131 may host a second domain (e.g., toplipts.com) that supports eSNI. As discussed above, the DNS entry for the second domain may include a second public encryption key for the second domain name. The user may enter the second domain as part of a URI (e.g., https://toplipts.com/) in the browser window. The browser may query DNS 160 for the IP address of the second domain (e.g., toplipts.com). In response to the query, the browser may receive a second IP address (e.g., 22.74.02.18) and the second public encryption key (e.g., SITE-1-KEY). Similar to the first query above, the DNS query may be captured by a DNS-QUERY-TRACKER 125 instance (not shown). After receiving the second IP address and the second public encryption key, the browser may establish a TCP connection with port 443 (HTTPS) of the second IP address (e.g., 22.74.02.18). To establish the TLS-secured session, the browser may generate a ClientHello message, encrypt the second domain name (e.g., toplipts.com) and/or one or more portions of the message using the second public encryption key (e.g., SITE-1-KEY), encapsulate the message in a TCP packet and an IP packet PKT-1 with the (L3/IP) destination IP address field set to the second IP address (e.g., 22.74.02.18), and forward the packet PKT-1 towards SRVR-1 131.

In step 830, ESNI-G/W 120 may intercept the packet PKT-1. ESNI-G/W 120 may examine the ClientHello message and determine that the message includes eSNI ciphertext. ESNI-G/W 120 may extract the (L3/IP) destination IP address (e.g., 22.74.02.18) and search the EDCL for an entry indexed by 22.74.02.18 by querying the EDCL-SVC 123. The search may return an entry from the EDCL. For example, the search may return row 314 from EDCL 300 discussed above with respect to FIG. 3. After examining the contents of the entry, the ESNI-G/W 120 may determine that the eSNI ciphertext corresponds to the plaintext domain name toplipts.com. The ESNI-G/W 120 may call the PKT-FILTER 122 system. As discussed above, PKT-FILTER 122 may be configured with the CTI-POLICY in step 805. ESNI-G/W 120 may search for a packet-filtering rule in CTI-POLICY that matches the criterion "toplipts.com." According to this example, a matching rule may be found that has a (network protective) "block" action for handling the matching packet (PKT-1). Additionally or alternatively, the matching rule may include a packet transformation function (PTF) "tcp-rst." ESNI-G/W 120 may spoof, or transparently proxy for, SRVR-1 131 and may send to HOST-1 110 a TLS Alert protocol message with a (fatal) alert code (e.g., code 40 "handshake failure"), which causes HOST-1 110 to close the TLS session. A TCP RST may cause HOST-1 110 to tear down the TCP connection. Alternatively, the ESNI-G/W 120 may send the TCP RST, which closes the TLS session without signaling. In this regard, the ESNI-G/W 120 may not want to provide any data and/or information to the HOST-1 110, which may have been compromised.

In step 835, the user of the web browser executing on HOST-1 110 may attempt to access site SRVR-2 132. SRVR-2 132 may host a third domain name (e.g., kottoqui.ga) that supports eSNI. That is, the DNS entry for the third domain name may include a public encryption key. The user may enter the third domain name as part of a URI (e.g., https://kottoqui.ga/) in a browser window. The browser on HOST-1 110 may query DNS 160 for a third IP address (e.g., 102.2.18.81) of the third domain name (e.g., kottoqui.ga) and a third public encryption key (e.g., SITE-2-KEY). As described above, the DNS query may be captured by a DNS-QUERY-TRACKER 125 (not shown). After receiving the third IP address and the third public encryption key, the browser may establish a TCP connection with port 443 (HTTPS) of 102.2.18.81. To establish the TLS-secured session, the browser may generate a ClientHello message, encrypt the third domain name (e.g., kottoqui.ga) and/or one or more other portions of the message using the third public encryption key (e.g., SITE-2-KEY), encapsulate the message in a TCP packet and an IP packet PKT-2 with the (L3/IP) destination IP address field set to 102.2.18.81, and forward the packet PKT-2 towards SRVR-2 132.

In step 840, ESNI-G/W 120 may intercept the packet PKT-2. ESNI-G/W 120 may examine the ClientHello message and determine that the message comprises an encrypted hostname (e.g., eSNI ciphertext). ESNI-G/W 120 may extract the (L3/IP) destination IP address (e.g., 102.2.18.81) and search the EDCL for an entry indexed by 102.2.18.81 by querying the EDCL-SVC 123. The search may return an entry from the EDCL. For example, the search may return row 310 from EDCL 300 discussed above with respect to FIG. 3. After examining the contents of the entry, ESNI-G/W 120 may determine that the plaintext domain name corresponding to the eSNI ciphertext cannot be determined from the EDCL. ESNI-G/W 120 may determine that all the domains hosted at IP address 102.2.18.81 have domain names that are in the CTI indicator database and associated CTI-POLICY and that support eSNI. Any of the eight (8) domain names in element {Row 310, Column 302} of EDCL 300 could be the plaintext domain name corresponding to the eSNI ciphertext. The ESNI-G/W 120 may select any one of the eight domain names as a likely correspondent and then proceed. Additionally or alternatively, ESNI-G/W 120 may check if the DNS-QUERY-TRACKER 125 has any entries that may determine the correspondent. In this example, ESNI-G/W 120 may check the DNS-QUERY-TRACKER 125 to determine that the third domain name (e.g., kottoqui.ga) is highly likely to be the correspondent. The ESNI-G/W 120 may call the PKT-FILTER 122 system, configured with the CTI-POLICY in step 805, to search for a packet-filtering rule in CTI-POLICY with matching criterion "kottoqui.ga." A matching rule may be found that has a (network protective) "block" action for handling the matching packet (PKT-2) and a packet transformation function (PTF) "tcp-rst." ESNI-G/W 120 may spoof, or transparently proxy for, SRVR-2 132. Additionally or alternatively, ESNI-G/W 120 may send a TLS Alert protocol message with a (fatal) alert code (e.g., code 40 "handshake failure") to HOST-1 110. The TLS Alert protocol message may cause HOST-1 110 to close the TLS session. Additionally or alternatively, ESNI-G/W 120 may send a TCP RST that causes HOST-1 110 to tear down the TCP connection.

Turning to FIG. 8B, the user of the web browser executing on HOST-1 110 may attempt to access site SRVR-3 133 in step 845. SRVR-3 133 may host a fourth domain name (e.g., cakbacon.cn) that supports eSNI. As with the examples above, the DNS entry for the fourth domain name may comprise a public encryption key. The user may enter the fourth domain name as part of a URI (e.g., https://cakbacon.cn/) in a browser window. The browser may query DNS 160 for the fourth IP address (e.g., 14.99.65.22) and a fourth public encryption key (e.g., SITE-3-KEY). The DNS query may be captured by a DNS-QUERY-TRACKER 125 instance (not shown). The browser may establish a TCP connection with port 443 (HTTPS) of 14.99.65.22. To establish the TLS-secured session, the browser may generate a ClientHello message, encrypt the fourth domain name (e.g., cakbacon.cn) and/or one or more portions of the message using the fourth public encryption key (e.g., SITE-3-KEY key), encapsulate the message in a TCP packet and an IP packet PKT-3 with the (L3/IP) destination IP address field set to 14.99.65.22, and forward the packet PKT-3 towards SRVR-3 133.

In step 850, ESNI-G/W 120 may intercept the packet PKT-3 and examine the ClientHello message. ESNI-G/W 120 may determine that the message includes an encrypted hostname (e.g., eSNI ciphertext). ESNI-G/W 120 may extract the (L3/IP) destination IP address 14.99.65.22 and search the EDCL for an entry indexed by 14.99.65.22 by querying the EDCL-SVC 123. The search may return an entry, such as row 312 in EDCL 300 described above in FIG. 3. After examining the contents of row 312, the ESNI-G/W 120 may determine that the plaintext domain name corresponding to the encrypted hostname (e.g., eSNI ciphertext) cannot be determined from the EDCL. ESNI-G/W 120 may determine that there are one or more domains hosted on 14.99.65.22 that are not in CTI. Additionally or alternatively, ESNI-G/W 120 may determine that the plaintext domain name corresponding to the encrypted hostname (e.g., eSNI ciphertext) shall be resolved to properly enforce policy associated with the communications. ESNI-G/W 120 may spoof, or transparently proxy for, SRVR-3 133. ESNI-G/W 120 may send a TLS message to HOST-1 110. The TLS message may cause HOST-1 110 to issue a ClientHello that does not encrypt the SNI. The TLS message may comprise a TLS Alert protocol message with a (fatal) alert code (e.g., code 70 "protocol version"). The TLS Alert protocol message may also cause HOST-1 110 to use a TLS version, such as TLS 1.2, that does not support encrypted SNI. Additionally or alternatively, ESNI-G/W 120 may send a TLS message that causes HOST-1 110 to not use the encrypted SNI option.

In step 860, the browser on HOST-1 110 may generate a ClientHello message with the SNI extension field set to (plaintext) cakbacon.cn, encapsulate the message in a TCP packet and an IP packet PKT-3.1 with the (L3/IP) destination IP address field set to 14.99.65.22, and forward the packet PKT-3.1 towards SRVR-3 133. In step 865, ESNI-G/W 120 may intercept the packet PKT-3.1 and examine the ClientHello message. ESNI-G/W 120 may determine that the message includes a cleartext SNI value cakbacon.cn. The ESNI-G/W 120 may call the PKT-FILTER 122 system, which was configured with the CTI-POLICY in step 805, to search for a packet-filtering rule in CTI-POLICY with matching criterion "cakbacon.cn." According to this example, a matching rule may be found that has a (network protective) "block" action for handling the matching packet (PKT-3.1) and a packet transformation function (PTF) "tcp-rst." ESNI-G/W 120 may spoof, or transparently proxy for, SRVR-3 133 and send a TLS Alert protocol message with a (fatal) alert code (e.g., code 40 "handshake failure") to HOST-1 110. The TLS Alert protocol message may cause HOST-1 110 to close the TLS session. Additionally or alternatively, ESNI-G/W 120 may send a TCP RST to HOST-1 110, which causes HOST-1 110 to tear down the TCP connection.

In step 870, the user of the web browser executing on HOST-1 110 may attempt to access site SRVR-4 134. SRVR-4 134 may host a fifth domain name (e.g., not-a-CTI-threat-site.net) that supports eSNI. As with previous discussions, the DNS entry may comprise a fifth public encryption key. The fifth domain name may not be listed in the CTI database and/or associated CTI-POLICY. The user may enter the fifth domain name as part of a URI (e.g., https://not-a-CTI-threat-site.net/) in a browser window. The browser on HOST-1 110 may query DNS 160 for the IP address (e.g., 14.99.65.22) of the fifth domain name (e.g., not-a-CTI-threat-site.net) and the fifth public encryption key (e.g., SITE-4-KEY). DNS 160 may return an entry, such as row 312 from EDCL 300 shown in FIG. 3. The DNS query may be captured by a DNS-QUERY-TRACKER 125 instance (not shown). After receiving the response to the DNS query, the browser on HOST-1 110 may establish a TCP connection with port 443 (HTTPS) of 14.99.65.22. To establish the TLS-secured session, the browser may generate a ClientHello message, encrypt the domain name (e.g., not-a-CTI-threat-site.net) and/or one or more additional fields the message using the fifth public encryption key (e.g., SITE-4-KEY), encapsulate the message in a TCP packet and an IP packet PKT-4 with the (L3/IP) destination IP address field set to 14.99.65.22, and forward the packet PKT-4 towards SRVR-4 134.

In step 875, ESNI-G/W 120 may intercept the packet PKT-4. ESNI-G/W 120 may examine the ClientHello message and determine that the message includes an encrypted hostname (e.g., eSNI ciphertext). ESNI-G/W 120 may extract the (L3/IP) destination IP address 14.99.65.22 and search the EDCL for an entry indexed by 14.99.65.22. Searching the EDCL may comprise querying the EDCL-SVC 123 using the IP address 14.99.65.22. The search may return an entry from the EDCL. The entry may be row 312 of EDCL 300 discussed above with respect to FIG. 3. After examining the contents of row 312, the ESNI-G/W 120 may determine that the plaintext domain name corresponding to the eSNI ciphertext cannot be determined from the EDCL. Additionally or alternatively, the ESNI-G/W 120 may determine that there are a plurality of domains hosted on 14.99.65.22 that are not in CTI. The ESNI-G/W 120 may also determine that the plaintext domain name corresponding to the encrypted hostname (e.g., eSNI ciphertext) shall be resolved to properly enforce one or more policies associated with the communications. ESNI-G/W 120 may spoof, or transparently proxy for, SRVR-4 134 and send to HOST-1 110 a TLS message that may cause HOST-1 110 to issue a ClientHello that does not encrypt the SNI. For example, ESNI-G/W 120 may send a TLS Alert protocol message with a (fatal) alert code (e.g., code 70 "protocol version") to HOST-1 110. The TLS Alert message may cause HOST-1 110 to use a TLS version (e.g., TLS 1.2) that does not support encrypted SNI. Additionally or alternatively, ESNI-G/W 120 may send a TLS message to HOST-1 110 that causes HOST-1 110 to not use the encrypted SNI option.

In step 880, the browser on HOST-1 110 may generate a ClientHello message with the SNI extension field set to (plaintext) not-a-CTI-threat-site.net, encapsulate the message in a TCP packet and an IP packet PKT-4.1 with the (L3/IP) destination IP address field set to 14.99.65.22, and forward the packet PKT-4.1 towards SRVR-4 134. In step 885, ESNI-G/W 120 may intercept the packet PKT-4.1 and examine the ClientHello message. Based on examining the ClientHello message, ESNI-G/W 120 may determine that the message includes a cleartext SNI value not-a-CTI-threat-site.net. The ESNI-G/W 120 may call the PKT-FILTER 122 system, configured with the CTI-POLICY in step 805, to search for a packet-filtering rule in CTI-POLICY with matching criterion "not-a-CTI-threat-site.net." The search may return no results. ESNI-G/W 120 may allow PKT-4.1 to proceed towards its destination 14.99.65.22 (SRVR-4 134). In step 890, the TLS tunnel between HOST-1 110 and SRVR-4 134 may be established, and a (TLS-secured) HTTP session may be conducted. Upon completion of the HTTP session, the TLS tunnel and the TCP connection may be torn down.

In some examples, organizations may have a policy that does not allow for the use of eSNI technology because the organization wants to track and police the external sites that its internal users access and/or attempt to access. In this example, the policy may be enforced by an ESNI-G/W application that executes a process similar to that described above in steps 870 through 890, but without the use of an EDCL and/or with policies that are different than CTI-POLICY. For example, in step 875, when the ESNI-G/W application determines that the ClientHello message includes eSNI ciphertext, the application may skip the search through an EDCL and have ESNI-G/W 120 spoof SRVR-4 134 in step 875. As noted above, ESNI-G/W may send a TLS message to HOST-1 110 that may cause HOST-1 110 to issue a ClientHello that does not include an encrypted SNI. Step 880 may execute without modification, while step 885 may apply a different policy than CTI-POLICY. If the policy applied in step 885 allows the communication session to proceed, then step 890 may execute without modification.

Figure 9:
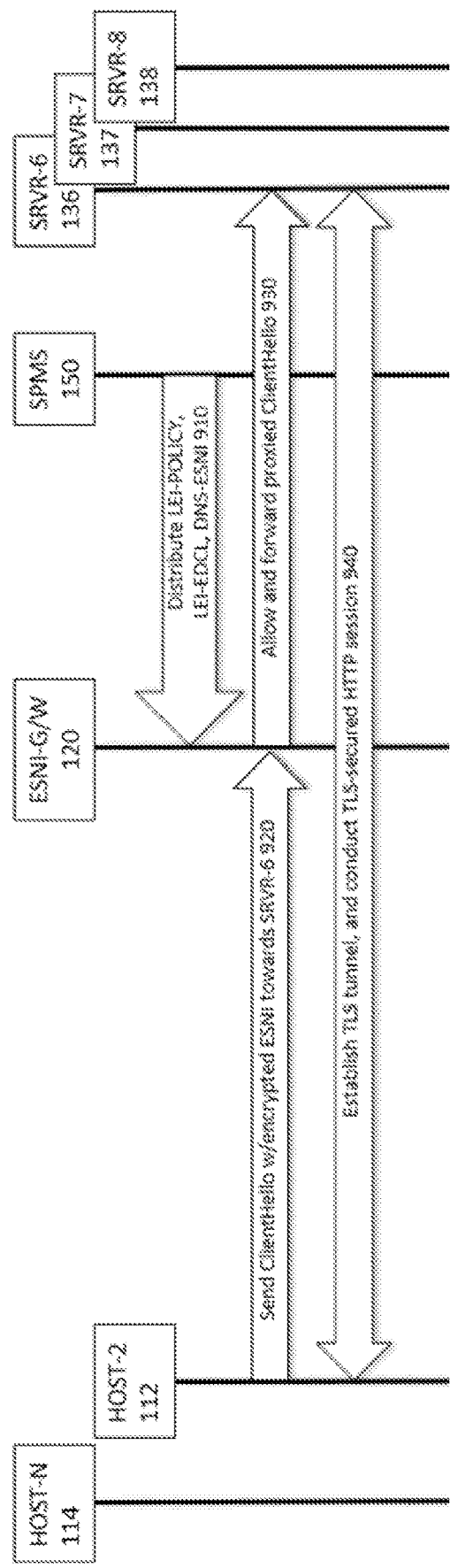
FIG. 9 shows a method for configuring and operating efficient eSNI gateways in accordance with one or more aspects described herein.

FIG. 9 shows an example of a process for configuring ESNI-G/W 120 with a packet filtering operation in support of one or more applications. The one or more applications may comprise, for example, a law enforcement (LE) application, such as lawful intercept, or (2) a privacy protection & preservation (P3) application. For LE applications, the packet filtering policy and/or EDCL may be derived from LEI indicators. Similarly, the packet filtering policy and/or EDCL may be derived from P3 indicators (P3I) for P3 applications. Such LE and P3 applications may include logic that depends on observing domain names associated with communications. If a communications is associated with a domain name that is included in some LEI database and/or P3I database, then the application may act on the communications.

This description of FIG. 9 is similar in form and functionality to the CTI application described in FIGS. 8A and 8B. For example, the CTI and/or associated CTI-POLICY and EDCL of FIGS. 8A and 8B may be analogous to the LEI and/or associated LEI-POLICY and LEI-EDCL of FIG. 9. The TLS-MITM-PROXY 126 may be used differently in FIG. 9 than in the examples discussed above. CTI and P3 and other applications may use the TLS-MITM-PROXY 126 component for similar reasons as LEI application, including, for example, (1) to decrypt communications ciphertext into cleartext so that the application may further examine the communications to determine the domain name that corresponds to eSNI ciphertext and then handle accordingly (e.g., invoke the PKT-FILTER 122 on the associated cleartext packets); and (2) to decrypt the communications and further examine the cleartext for other information besides domain names, such as user IDs, in order to make communications handling decisions (e.g., whether to capture/store the cleartext communications).

In step 910, the SPMS 150 may distribute an LEI-derived packet filtering policy (e.g., LEI-POLICY) and associated LEI-derived LEI-EDCL to ESNI-G/W 120. Additionally or alternatively, SPMS 150 may distribute DNS-ESNI. ESNI-G/W 120 may configure its PKT-FILTER 122, EDCL-SVC 123, and/or DNS-ESNI-SVC 124, for example, based on the LEI-derived packet filtering policy (e.g., LEI-POLICY), the associated LEI-derived LEI-EDCL, and/or the DNS-ESNI. In some examples, the SPMS 150 may distribute additional LEI data, including, for example, one or more lists of user IDs.

In step 920, the user of a web browser executing on HOST-2 112 may attempt to access site SRVR-6 136. SRVR-6 136 may hosts a seventh domain name (e.g., LEI-watchlist-site.net) that supports eSNI. That is, the DNS entry for the seventh domain may comprise a seventh public encryption key. The user may enter the seventh domain name as part of a URI (e.g. https://LEI-watchlist-site.net/) in a browser window. The browser may query DNS 160 for the seventh IP address (e.g., 21.43.65.87) of LEI-watchlist-site.net and the seventh public encryption key (e.g., SITE-6-KEY). The DNS query may be captured by a DNS-QUERY-TRACKER 125 instance (not shown). After receiving a response from DNS 160, the browser on HOST-2 112 may establish a TCP connection with port 443 (HTTPS) of 21.43.65.87. To establish the TLS-secured session, the browser may generate a ClientHello message, encrypt the domain name and/or one or more portions of the message using the seventh public encryption key (e.g., SITE-6-KEY), encapsulate the message in a TCP packet and an IP packet PKT-6 with the (L3/IP) destination IP address field set to 21.43.65.87, and forward the packet PKT-6 towards SRVR-6 136.

In step 930, ESNI-G/W 120 may intercept the packet PKT-6 and examine the ClientHello message contained therein. ESNI-G/W 120 may determine that the message includes an encrypted hostname (e.g., eSNI ciphertext). ESNI-G/W 120 may extract the (L3/IP) destination IP address 21.43.65.87 and search the LEI-EDCL for an entry indexed by 21.43.65.87 by querying the EDCL-SVC 123. The search may return an entry (indexed by 21.43.65.87) of the LEI-EDCL. Based on the search result, ESNI-G/W 120 may determine (resolve) the (plaintext) domain name as "LEI-watchlist-site.net." ESNI-G/W 120 may call the PKT-FILTER 122, which was configured with the LEI-POLICY in step 910, to search for a packet-filtering rule in LEI-POLICY with matching criterion "LEI-watchlist-site.net." A matching rule may be found that indicates an "allow" action for handling the matching packet (PKT-6) and a packet transformation function (PTF) "tls-mitm-proxy." The PTF "tls-mitm-proxy" may signal the ESNI-G/W 120 to forward PKT-6 and subsequent packets associated with the same flow/communications as PKT-6 to TLS-MITM-PROXY 126. After passing through TLS-MITM-PROXY 126, PKT-6 may be forwarded by ESNI-G/W 120 towards SRVR-6 136. In some examples, a proxied version of PKT-6 may be forwarded to SRVR-6 136.

In step 940, a TLS tunnel between HOST-2 112 and SRVR-6 136 may be established, and a (TLS-secured) HTTP session may be conducted. The packets comprising the session pass through the TLS-MITM-PROXY 126, and the application may capture and store the decrypted cleartext messages/packets. The application may also inspect the cleartext for additional information, for example user IDs, to determine if it is permissible to capture and store the cleartext. If it is not permissible, then the capture and store functions may be terminated and any stored data erased and/or otherwise made inaccessible. Upon completion of the HTTP session, the TLS tunnel and the TCP connection may be torn down.

Figure 10:
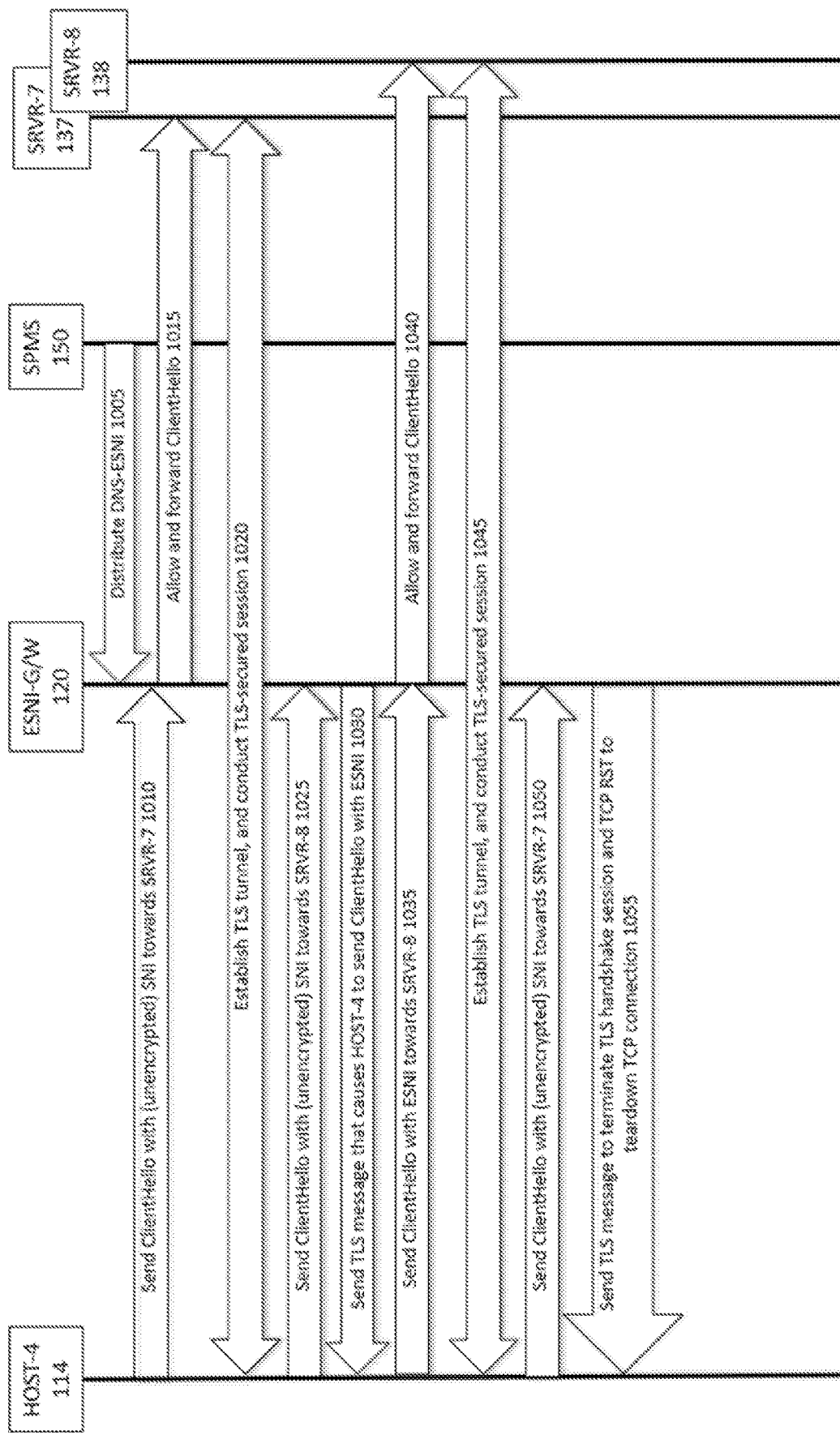
FIG. 10 shows a method for configuring and operating efficient eSNI gateways in accordance with one or more examples described herein.

FIG. 10 illustrates an example of packet filtering by ESNI-G/W 120 that minimizes eavesdropping. A first application may enforce the use of eSNI whenever eSNI is available. A second application may enforce the use of eSNI for all TLS-secured communications. That is, the second application may only allow TLS-secured communications that support eSNI and eSNI may be used to access those sites.

In step 1005, the SPMS 150 may distribute DNS-ESNI to ESNI-G/W 120. The DNS-ESNI may be an updated version of the DNS-ESNI. ESNI-G/W 120 may configure the DNS-ESNI-SVC 124 with DNS-ESNI. ESNI-G/W 120 may be executing the first application (e.g., that enforces use of eSNI whenever eSNI is available).

In step 1010, the user of a web browser executing on HOST-4 114 may attempt to access site SRVR-7 137. SRVR-7 137 may host an eighth domain name (e.g., non-eSNI-site.net) that does not support eSNI. The user may enter the eighth domain name as part of a URI (e.g., https://non-eSNI-site.net/) in a browser window. In response to receiving the eighth domain name, the browser may query DNS 160 for the IP address (e.g., 78.56.34.12) of the eighth domain name (e.g., non-eSNI-site.net). Upon receiving the IP address, the browser may establish a TCP connection with port 443 (HTTPS) of 78.56.34.12. To establish the TLS-secured session, the browser may generate a ClientHello message with the SNI field set to the plaintext "non-eSNI-site.net," encapsulate the message in a TCP packet and an IP packet PKT-7 with the (L3/IP) destination IP address field set to 78.56.34.12, and forward the packet PKT-7 towards SRVR-7 137.

In step 1015, ESNI-G/W 120 may intercept the packet PKT-7 and examine the ClientHello message contained therein. ESNI-G/W 120 may determine that the message includes a cleartext SNI value, "non-eSNI-site.net." ESNI-G/W 120 may query the DNS-ESNI-SVC 124 to determine that the domain "non-eSNI-site.net" does not support eSNI. ESNI-G/W 120 may allow PKT-7 to proceed towards its destination 78.56.34.12 (SRVR-7 137). In step 1020, a TLS tunnel between HOST-4 114 and SRVR-7 137 may be established, and a (TLS-secured) HTTP session may be conducted. Upon completion of the HTTP session, the TLS tunnel and the TCP connection may be torn down.

In step 1025, the user of a web browser executing on HOST-4 114 may attempt to access site SRVR-8 138. SRVR-8 138 may host a ninth domain name (e.g., supports-eSNI-site.net) that supports eSNI. The user may enter the ninth domain name as part of a URI (e.g., https://supports-eSNI-site.net/) in a browser window. Next, the browser may query DNS 160 for the IP address (e.g., 12.34.43.21) of the ninth domain (e.g., supports-eSNI-site.net). Upon receiving the IP address, the browser may establish a TCP connection with port 443 (HTTPS) of 12.34.43.21. To establish the TLS-secured session, the browser may generate a ClientHello message with the SNI field set to the plaintext "supports-eSNI-site.net," encapsulate the message in a TCP packet and an IP packet PKT-8 with the (L3/IP) destination IP address field set to 12.34.43.21, and forward the packet PKT-8 towards SRVR-8 138.

In step 1030, ESNI-G/W 120 may intercept the packet PKT-8 and examine the ClientHello message contained therein. ESNI-G/W 120 may determine that the message includes a cleartext SNI value "supports-eSNI-site.net." ESNI-G/W 120 may query the DNS-ESNI-SVC 124 to determine that the domain "supports-eSNI-site.net" supports eSNI. Because the first application requires using eSNI when it is available, ESNI-G/W 120 may spoof, or transparently proxy for, SRVR-8 138. ESNI-G/W 120 may send a TLS message to HOST-4 114 that may cause HOST-4 114 to issue a ClientHello that uses eSNI. The TLS message may comprise a TLS alert protocol message that signals HOST-4 114 that eSNI is required.

In step 1035, the browser executing on HOST-4 114 may query DNS 160 for the public encryption key (e.g., SITE-8-KEY) for the domain "supports-eSNI-site.net." The browser may generate a ClientHello message, encrypt the domain name "supports-eSNI-site.net" and/or one or more other portions of the message using the public encryption key (e.g., SITE-8-KEY), encapsulate the message in a TCP packet and an IP packet PKT-8.1 with the (L3/IP) destination IP address field set to 12.34.43.21, and forward the packet PKT-8.1 towards SRVR-8 138.

In step 1040, ESNI-G/W 120 may intercept the packet PKT-8.1 and examine the ClientHello message contained therein. ESNI-G/W 120 may determine that the message includes eSNI ciphertext. ESNI-G/W 120 may allow PKT-8.1 to proceed by forwarding PKT-8.1 towards its destination 12.34.43.21 (SRVR-8 138).

In step 1045, the TLS tunnel between HOST-4 114 and SRVR-8 138 may be established, and a (TLS-secured) HTTP session may be conducted. Upon completion of the HTTPS session, the TLS tunnel and the TCP connection may be torn down.

During steps 1050 and 1055, ESNI-G/W 120 may be operating the second application that only allows access to sites that support eSNI and requires eSNI usage.

In step 1050, the user of a web browser executing on HOST-4 114 may attempt to access site SRVR-7 137. SRVR-7 137 may host a tenth domain name (e.g., non-eSNI-site.net) that does not support eSNI. The user may enter the domain name as part of a URI (e.g., https://non-eSNI-site.net/) in a browser window. The browser may query DNS 160 for the IP address (e.g., 78.56.34.12) of non-eSNI-site.net. Upon receiving the IP address, the browser may establish a TCP connection with port 443 (HTTPS) of 78.56.34.12. To establish the TLS-secured session, the browser may create a ClientHello message with the SNI field set to the plaintext "non-eSNI-site.net," encapsulate the message in a TCP packet and an IP packet PKT-9 with the (L3/IP) destination IP address field set to 78.56.34.12, and forward the packet PKT-9 towards SRVR-7 137.

In step 1055, ESNI-G/W 120 may intercept the packet PKT-9 and examine the ClientHello message contained therein. ESNI-G/W 120 may determine that the message includes a cleartext SNI value "non-eSNI-site.net." ESNI-G/W 120 may query the DNS-ESNI-SVC 124 to determine that the domain "non-eSNI-site.net" does not support eSNI. Because the second application may only allow access to sites that support eSNI, then ESNI-G/W 120 may spoof, or transparently proxy for, SRVR-7 137. The second application may perform similarly to the first application, described above, when accessing a site that supports eSNI. ESNI-G/W 120 may send a TLS Alert protocol message with a (fatal) alert code (e.g., code 40 "handshake failure") to HOST-4 114. The TLS Alert protocol message may cause HOST-4 114 to close the TLS session. Additionally or alternatively, ESNI-G/W 120 may send a TCP RST to HOST-4 114. The TCP RST may cause HOST-4 114 to tear down the TCP connection.

Figure 11:
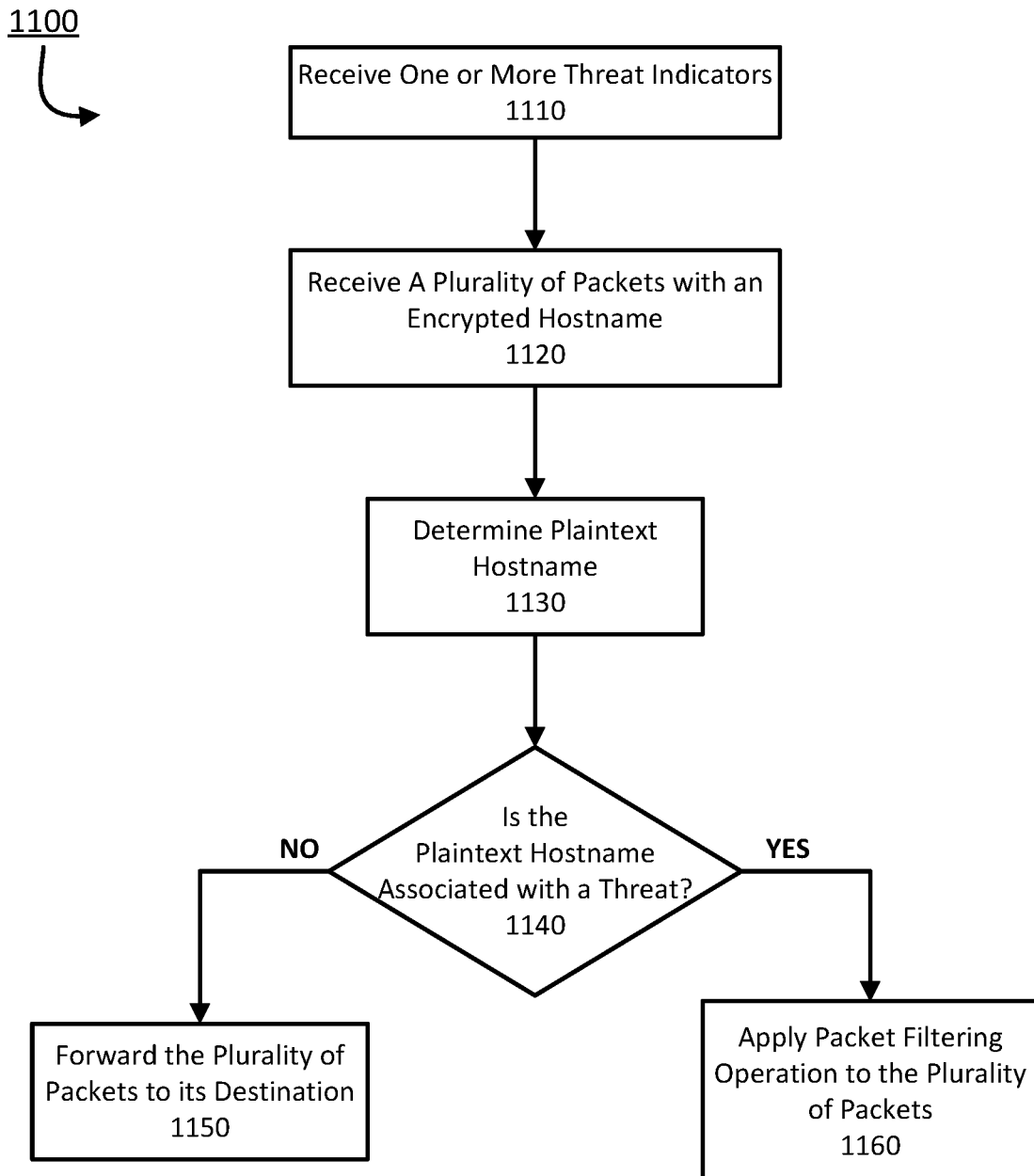
FIG. 11 shows an example of a process for determining whether encrypted network traffic is associated with one or more threats.

As noted above, a packet filtering system may receive packets that comprise ciphertext that includes an encrypted server name indication (SNI) value. The packet filtering system may determine a plaintext hostname associated with the encrypted hostname to determine whether the plaintext hostname is associated with one or more threats. FIG. 11 shows an example of a process 1100 for determining whether encrypted network traffic is associated with one or more threats. Some or all of the steps of process 1100 may be performed using one or more computing devices, such as packet security gateway 120.

In step 1110, a packet-filtering device may receive one or more threat indicators. For example, the packet filtering device may receive threat indicators (e.g., raw threat indicators) directly from one or more cyber threat intelligence providers (CTIPs) and create one or more packet-filtering rules. The packet-filtering rules may be received from a security policy management server (SPMS). Additionally or alternatively, the one or more threat indicators may be received indirectly as matching criteria in packet-filtering rules. In further examples, the packet filtering device may receive one or more policies composed of packet-filtering rules derived from threat indicators. The one or more policies may comprise an enterprise communication policy; a privacy, protection, and preservation policy; a law enforcement policy; or an equivalent thereof. The packet-filtering device may reside at a boundary that interfaces between a first network and a second network. In this regard, the packet-filtering device may be a gateway, a firewall, a router, or any other type of edge device. Additionally or alternatively, the packet-filtering device may be a pass-through device located on one or more network segments. As discussed above, the one or more threat indicators may comprise a plurality of domain names (e.g., hostnames) associated with one or more threats. Additionally or alternatively, the one or more threat indicators may comprise a plurality of network addresses (e.g., IP addresses) associated with one or more threats.

In step 1120, the packet-filtering device may receive a plurality of packets that comprise ciphertext that includes an encrypted Server Name Indication (SNI) value. The plurality of packets may be associated with a single communication and/or message, such as a ClientHello message. As noted above, the plurality of packets may comprise ciphertext that includes an encrypted Server Name Indication (SNI) value.

In step 1130 the packet-filtering device may determine whether a plaintext hostname can be resolved from the encrypted hostname (e.g., an encrypted SNI (eSNI)). The packet-filtering device may use one or more of the techniques described above with respect to FIGS. 8A and 8B. For example, the packet-filtering device may determine a destination network address (e.g., IP address) associated with the plurality of packets. The packet-filtering device may query a data structure indexed by the destination network address to determine the plaintext hostname associated with or corresponding to the encrypted hostname. Based on the query, the packet-filtering device may receive a response comprising the plaintext hostname associated with the encrypted hostname. The queried data structure may be an eSNI Domain Name Correspondence List (EDCL), as discussed above. In some examples, the response may comprise a plurality of plaintext hostnames that may correspond to the encrypted hostname. That is, a plurality of hostnames may be associated with the destination network address. The packet-filtering device may indicate that the encrypted hostname corresponds to one of the plurality of hostnames associated with the destination network address. Additionally, there may be other domain names hosted at the destination network address with domain names that may correspond to the ciphertext; however, these domains names may not be listed in the EDCL because the domain names are either not in the CTI database or they do not support eSNI.

In another example, the packet-filtering device may receive a DNS query request from a first device and may receive a corresponding DNS query reply from the DNS. The DNS query request and/or reply may be received before receiving the plurality of packets. The DNS query request and/or reply may be stored in a data structure. In response to receiving the plurality of packets, the packet-filtering device may query the data structure to determine the plaintext hostname based on receiving the plurality of packets with the encrypted hostname from the first device. In this regard, the packet-filtering device may determine that the encrypted hostname corresponds to the plaintext hostname that was the subject of the DNS query.

In some examples, the packet-filtering device may determine a destination network address associated with the plurality of packets. With the examples above, the packet-filtering device may query a data structure to determine the plaintext hostname associated with the encrypted hostname using the destination network address. In response to the query, the packet-filtering device may receive a response that the destination network address could not be located in the data structure. The packet-filtering device may transmit a response to the first device. The response may request retransmission of the plurality of packets with a plaintext hostname (e.g., an unencrypted Server Name Indication (SNI)). The packet-filtering device may receive the retransmission of the plurality of packets with the plaintext hostname (e.g., SNI).

In step 1140, the packet-filtering device may determine whether the plaintext hostname matches one or more threat indicators. The determination may be based on at least one of: the plaintext hostname resolved from the an encrypted server name indication (eSNI) value, the plaintext hostname associated with a destination network address, a DNS query, etc. As discussed above, a plurality of plaintext hostnames may be associated with one or more threat indicators. As discussed above, a plurality of plaintext hostnames may be determined from the ciphertext that comprising an encrypted Server Name Indication (eSNI) value, for example, if a plurality of domains are hosted on a network destination address. In this regard, the packet-filtering device may compare each of the plurality of hostnames to the one or more threat indicators. If one of a plurality of plaintext hostnames is associated with one or more threat indicators, the packet-filtering device may determine that the plurality of packets are associated with one or more threat indicators. If the plaintext hostname does not match at least one of the one or more threat indicators, the packet-filtering device may forward the plurality of packets toward its destination in step 1150. In some examples, allowing the communications to proceed toward their destination may allow a secure communication channel (e.g. TLS) to be established between the first device and the hostname. When the plaintext hostname matches one or more threat indicators, the packet filtering device may apply a packet filtering operation to the plurality of packets. The packet filtering operation may comprise blocking the plurality of packets from continuing toward its intended destination. Additionally or alternatively, the packet-filtering device may allow the plurality of packets to continue to its intended destination, while forwarding a copy of the plurality of packets to a first proxy system for monitoring. Additionally or alternatively, the packet-filtering device may forward the plurality of packets to a second proxy for further processing and/or analysis.

Figure 12:
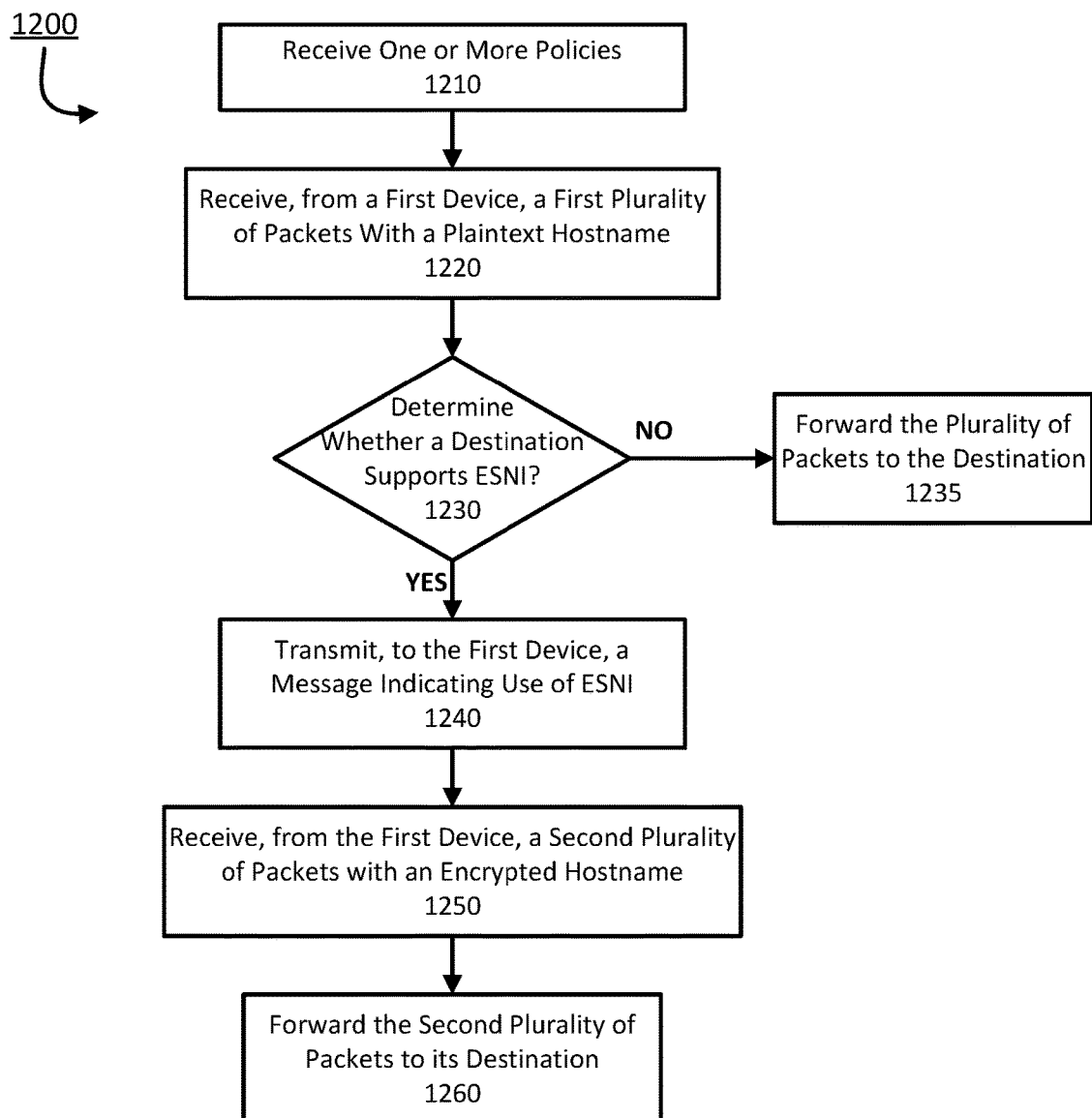
FIG. 12 shows an example of a process for enforcing a policy of using encrypted hostnames in accordance with one or more examples described herein.

In some instances, enterprise hosts may be required to use encrypted hostnames when communicating with destinations that support ciphertext that includes an encrypted Server Name Indication (SNI) value. FIG. 12 shows an example of a process 1200 for enforcing a policy of using encrypted hostnames in accordance with one or more examples described herein. Some or all of the steps of process 1200 may be performed using one or more computing devices, such as packet security gateway 120.

In step 1210, the packet-filtering device may receive one or more policies, as described above with respect to FIG. 9. The packet-filtering device may be configured with a plurality of packet-filtering rules.

In step 1220, the packet-filtering device may receive a first plurality of packets intended for a destination from a first device. The first plurality of packets may be associated with a communication or message, such as a ClientHello message. The first plurality of packets may comprise a plaintext hostname.

In step 1230, the packet-filtering device may determine whether the destination supports eSNI. For example, the packet-filtering device may query a domain name service to determine whether an entry for the destination comprises a public key. If the entry comprises a public key, the packet-filtering device may determine that the destination supports eSNI. Additionally or alternatively, the packet-filtering device may query a data structure (e.g., table, database, etc.) to determine whether the destination supports eSNI. The packet-filtering device may determine that the destination supports eSNI when an entry for the destination exists in the data structure. If the destination does not support eSNI, the packet-filtering device may forward the plurality of packets to the destination in step 1235. The plurality of packets may comprise one or more communications associated with creating a secure communication channel (e.g., TLS) between the first device and the destination. If the destination does support eSNI, the packet-filtering device may transmit a message comprising an indication that the first device use eSNI in step 1240.

In step 1250, the packet-filtering device may receive a second plurality of packets intended for the destination from the first device. The second plurality of packets may comprise ciphertext that includes an encrypted Server Name Indication (SNI) value (e.g., eSNI ciphertext). In some examples, the packet-filtering device may perform the analysis discussed above with respect to FIG. 11 to determine the plaintext hostname and whether the plaintext hostname is associated with one or more threat indicators. The policy enforcement aspects and the filtering aspects may be performed concurrently or consecutively. In some examples, the packet-filtering device may store plaintext hostname from the first plurality of packets and correlate the plaintext hostname with the eSNI ciphertext in the second plurality of packets. As noted above, if the destination is not associated with one or more threat indicators, the packet-filtering device may forward the second plurality of packets toward the destination in step 1260. Additionally or alternatively, the second plurality of packets may be forwarded in response to a determination that the second plurality of packets comprises an encrypted SNI (e.g., eSNI ciphertext).

The second plurality of packets may comprise one or more communications associated with creating a secure communication channel (e.g., TLS) between the first device and the destination.

Figure 13:
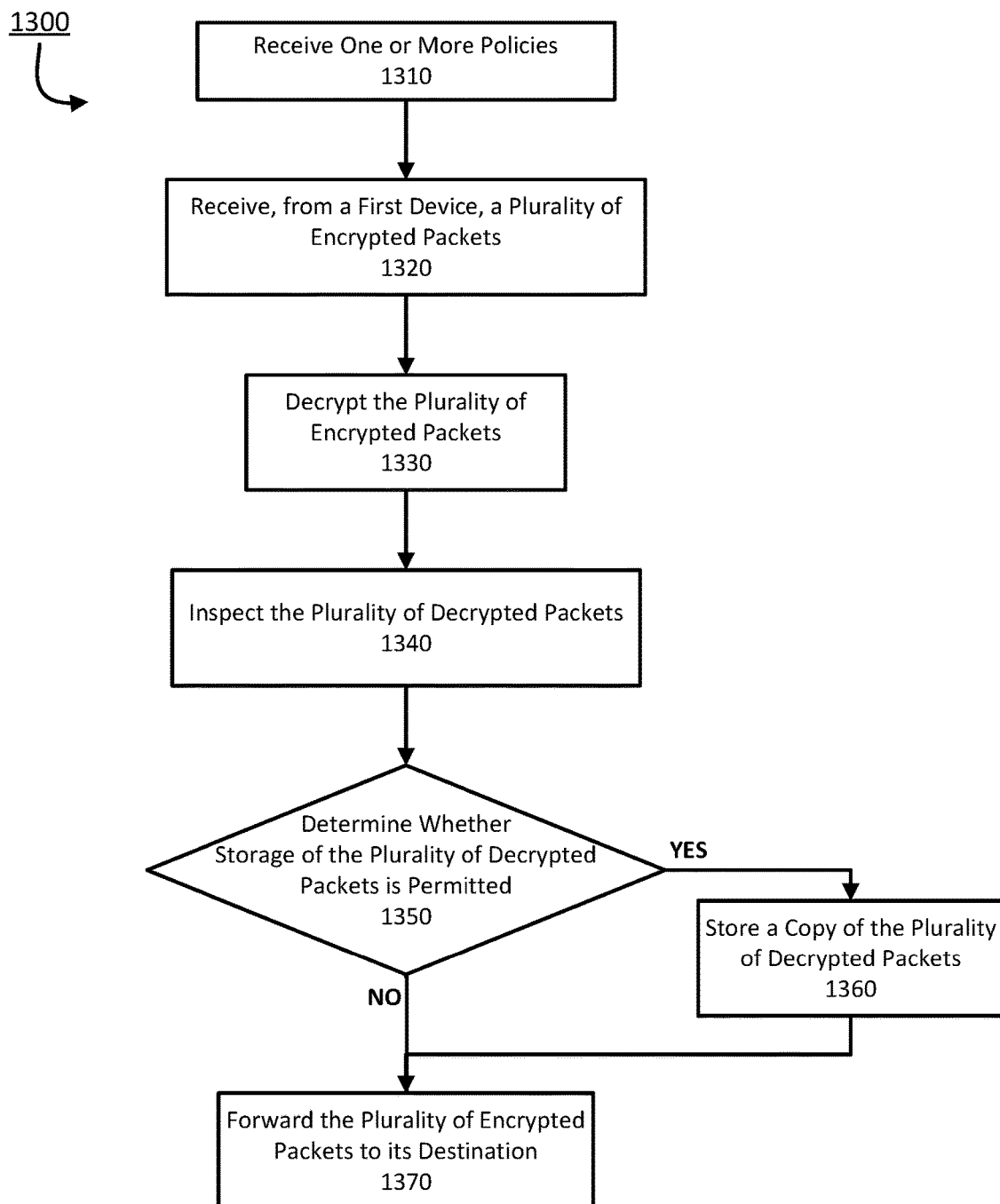
FIG. 13 shows an example of a method for storing packets in accordance with one or more examples described herein.

The packet-filtering device may store one or more packets in accordance with a policy, such as an enterprise policy (e.g., data retention policy, regulatory compliance policy, etc.), a law enforcement policy, or a privacy, protection, and preservation (P3) policy. FIG. 13 shows an example of a process 1300 for storing packets. Some or all of the steps of process 1300 may be performed using one or more computing devices, such as packet security gateway 120.

In step 1310, the packet-filtering device may receive one or more policies. The packet-filtering device may be configured with a plurality of packet-filtering rules. The one or more policies may comprise an enterprise communication policy; a privacy, protection, and preservation policy; a law enforcement policy; or an equivalent thereof. In step 1320, the packet-filtering device may receive a plurality of encrypted packets. The plurality of encrypted packets may comprise an encrypted hostname (e.g., eSNI ciphertext). As noted above, the packet-filtering device may perform the analysis discussed above with respect to FIG. 11 to determine the plaintext hostname and whether the plaintext hostname is associated with one or more threat indicators.

In step 1330, the packet-filtering device may decrypt the plurality of encrypted packets to obtain a plurality of cleartext packets. The packet-filtering device may forward the plurality of encrypted packets to a (transparent) intermediary TLS Man-In-The-Middle (MITM) proxy function. The MITM proxy function may decrypt a TLS-secured application session, examine the session in the clear, re-encrypt the session, and forward the TLS-secured session toward its destination. In step 1340, the packet-filtering device (e.g., the MITM proxy function) may inspect (e.g., examine) the cleartext packets. In some examples, the packet-filtering device may extract a plaintext domain name that corresponds to the eSNI ciphertext in the session's contents. In some instances, the packet-filtering device may perform the analysis discussed above with respect to FIG. 11 using the extracted plaintext domain name.

In step 1350, the packet-filtering device may determine if the plurality of packets are allowed to be capture and stored. The determination may be based on policy, such as an enterprise communication policy; a privacy, protection, and preservation policy; a law enforcement policy; or an equivalent thereof. In this regard, the enterprise communication policy may require logging and/or archiving of communications to comply with regulatory schemes (i.e., HIPAA, Sarbanes-Oxley, etc.). In another example, the law enforcement policy may be based on whether law enforcement is authorized to store the communications. If a rationale exists for storing the plurality of packets, the packet filtering device may store a copy of the plurality of decrypted packets in step 1360. After the decrypted packets are stored, process 1300 may proceed to step 1370. If the plurality of decrypted packets is not permitted to be stored or after storing the decrypted packets, the packet-filtering device may forward the plurality of encrypted packets to its destination. As noted above, the plurality of encrypted packets may allow a secure communication channel (e.g., TLS) between the first device and the destination.

The techniques described herein allow packet-filtering devices to resolve plaintext hostnames from encrypted hostnames. The plaintext hostname may be used to determine whether the network traffic is malicious in nature. This allows packet-filtering devices to prevent malware from using secure communication channels to bypass packet filtering devices when attempting to communicate with malicious hosts. Further, the techniques described herein allow packet-filtering devices to monitor encrypted network traffic for known threats. This provides improved network monitoring and reduces the spread of malware. Additionally, enforcing eSNI when supported by destinations reduces the threat of privacy breaches, such as through malicious eavesdropping. Moreover, the techniques described herein may enforce communications to comply with privacy laws and/or regulations. Finally, the techniques described herein may assist law enforcement in its monitoring of encrypted network traffic.

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

The invention claimed is:

1. A packet filtering device comprising:
one or more processors; and
memory storing instructions that, when executed by the one or more processors, cause the packet filtering device to:
receive one or more policies comprising a plurality of packet-filtering rules, wherein the plurality of packet-filtering rules were generated based on one or more network threat indicators comprising a plurality of domain names associated with one or more threats;

receive, from a first device, a plurality of packets, wherein the plurality of packets comprises ciphertext comprising an encrypted server name indication (eSNI) value;

determine whether a plaintext hostname is resolvable from the ciphertext without decrypting the ciphertext;

determine, based on a determination that the plaintext hostname is resolvable from the ciphertext, whether the plaintext hostname matches at least one domain name of the plurality of domain names associated with one or more threats; and apply, based on a determination that the plaintext hostname matches a first domain name indicated by a first packet-filtering rule of the plurality of packet-filtering rules, a packet filtering operation to the plurality of packets.

2. The packet filtering device of claim 1, wherein the instructions, when executed by the one or more processors, cause the packet filtering device to:

determine a destination network address associated with the plurality of packets;

query, using the destination network address, a data structure to determine the plaintext hostname associated with the ciphertext; and receive, based on querying the data structure, a response comprising the plaintext hostname associated with the ciphertext.

3. The packet filtering device of claim 1, wherein the instructions, when executed by the one or more processors, cause the packet filtering device to:

determine a destination network address associated with the plurality of packets;

query, using the destination network address, a data structure to determine the plaintext hostname associated with the ciphertext; and receive, based on querying the data structure, a response comprising a plurality of hostnames associated with the destination network address, wherein the plurality of hostnames comprises the plaintext hostname.

4. The packet filtering device of claim 1, wherein the instructions, when executed by the one or more processors, cause the packet filtering device to:

determine a destination network address associated with the plurality of packets;

query, using the destination network address, a data structure to determine the plaintext hostname associated with the ciphertext;

receive, based on querying the data structure, a response that the plaintext hostname cannot be resolved from the destination network address;

transmit, to a first device that sent the plurality of packets, a response indicating retransmission of the plurality of packets with a plaintext server name indication (SNI); and receive the retransmission of the plurality of packets with the plaintext SNI.

5. The packet filtering device of claim 1, wherein the instructions, when executed by the one or more processors, cause the packet filtering device to:

receive, prior to receiving the plurality of packets, a DNS query request and an associated DNS query response;

store the DNS query in a data structure; and query, based on receiving the plurality of packets with the ciphertext from the first device, the data structure to determine the plaintext hostname.

6. The packet filtering device of claim 1, wherein the packet filtering operation comprises blocking the plurality of packets from continuing toward its intended destination, and the instructions, when executed by the one or more processors, cause the packet filtering device to:

send, to the first device, a response to the plurality of packets, wherein the response comprises at least one of: a TCP Reset (RST) message or a TLS handshake proxy message.

7. The packet filtering device of claim 1, wherein the instructions, when executed by the one or more processors, cause the packet filtering device to:

receive a second plurality of packets, wherein the second plurality of packets comprises second ciphertext comprising a second eSNI value;

determine whether a second plaintext hostname is resolvable from the second ciphertext;

determine, based on a determination that the second plaintext hostname is resolvable from the second ciphertext, whether the second plaintext hostname matches at least one domain name of the plurality of domain names associated with one or more threats; and allow, based on a determination that the second plaintext hostname does not match a domain name indicated by any of the plurality of packet-filtering rules, the second plurality of packets to continue toward its intended destination.

8. The packet filtering device of claim 7, wherein the second plurality of packets comprise one or more communications for creating a secure communication channel with the intended destination.

9. The packet filtering device of claim 1, wherein the packet filtering device resides at a boundary that interfaces between a protected network and an unprotected network.

10. The packet filtering device of claim 1, wherein the packet filtering operation comprises at least one of:

blocking the plurality of packets from continuing toward its intended destination;

allowing the plurality of packets to continue to its intended destination and forwarding a copy of the plurality of packets to a first proxy for monitoring; or forwarding the plurality of packets to a second proxy.

11. A non-transitory computer-readable medium storing instructions that, when executed by one or more processors, cause a packet filtering device to:

receive one or more policies comprising a plurality of packet-filtering rules, wherein the plurality of packet-filtering rules were generated based on one or more network threat indicators comprising a plurality of domain names associated with one or more threats;

receive, from a first device, a plurality of packets, wherein the plurality of packets comprises ciphertext comprising an encrypted server name indication (eSNI) value;

determine whether a plaintext hostname is resolvable from the ciphertext without decrypting the ciphertext;

determine, based on a determination that the plaintext hostname is resolvable from the ciphertext, whether the plaintext hostname matches at least one domain name of the plurality of domain names associated with one or more threats; and apply, based on a determination that the plaintext hostname matches a first domain name indicated by a first packet-filtering rule of the plurality of packet-filtering rules, a packet filtering operation to the plurality of packets.

12. The non-transitory computer-readable medium of claim 11, wherein the instructions, when executed by the one or more processors, cause the packet filtering device to:
determine a destination network address associated with the plurality of packets;
query, using the destination network address, a data structure to determine the plaintext hostname associated with the ciphertext; and
receive, based on querying the data structure, a response comprising the plaintext hostname associated with the ciphertext.

13. The non-transitory computer-readable medium of claim 11, wherein the instructions, when executed by the one or more processors, cause the packet filtering device to:
determine a destination network address associated with the plurality of packets;
query, using the destination network address, a data structure to determine the plaintext hostname associated with the ciphertext; and
receive, based on querying the data structure, a response comprising a plurality of hostnames associated with the destination network address, wherein the plurality of hostnames comprises the plaintext hostname.

14. The non-transitory computer-readable medium of claim 11, wherein the instructions, when executed by the one or more processors, cause the packet filtering device to:
determine a destination network address associated with the plurality of packets;
query, using the destination network address, a data structure to determine the plaintext hostname associated with the ciphertext;
receive, based on querying the data structure, a response that the plaintext hostname cannot be resolved from the destination network address;
transmit, to a first device that sent the plurality of packets, a response indicating retransmission of the plurality of packets with a plaintext server name indication (SNI); and
receive the retransmission of the plurality of packets with the plaintext SNI.

15. The non-transitory computer-readable medium of claim 11, wherein the instructions, when executed by the one or more processors, cause the packet filtering device to:
receive, prior to receiving the plurality of packets, a DNS query request and an associated DNS query response;
store the DNS query in a data structure; and
query, based on receiving the plurality of packets with the ciphertext from the first device, the data structure to determine the plaintext hostname.

16. The non-transitory computer-readable medium of claim 11, wherein the packet filtering operation comprises blocking the plurality of packets from continuing toward its intended destination, and the instructions, when executed by the one or more processors, cause the packet filtering device to:
send, to the first device, a response to the plurality of packets, wherein the response comprises at least one of: a TCP Reset (RST) message or a TLS handshake proxy message.

17. The non-transitory computer-readable medium of claim 11, wherein the instructions, when executed by the one or more processors, cause the packet filtering device to:
receive a second plurality of packets, wherein the second plurality of packets comprises second ciphertext comprising a second eSNI value;
determine whether a second plaintext hostname is resolvable from the second ciphertext;
determine, based on a determination that the second plaintext hostname is resolvable from the second ciphertext, whether the second plaintext hostname matches at least one domain name of the plurality of domain names associated with one or more threats; and
allow, based on a determination that the second plaintext hostname does not match a domain name indicated by any of the plurality of packet-filtering rules, the second plurality of packets to continue toward its intended destination.

18. The non-transitory computer-readable medium of claim 17, wherein the second plurality of packets comprise one or more communications for creating a secure communication channel with the intended destination.

19. The non-transitory computer-readable medium of claim 11, wherein the packet filtering device resides at a boundary that interfaces between a protected network and an unprotected network.

20. The non-transitory computer-readable medium of claim 11, wherein the packet filtering operation comprises at least one of:
blocking the plurality of packets from continuing toward its intended destination;
allowing the plurality of packets to continue to its intended destination and forwarding a copy of the plurality of packets to a first proxy for monitoring; or
forwarding the plurality of packets to a second proxy.

21. A method comprising:
receiving, by a packet filtering device, one or more policies comprising a plurality of packet-filtering rules, wherein the plurality of packet-filtering rules were generated based on one or more network threat indicators comprising a plurality of domain names associated with one or more threats;
receiving, from a first device, a plurality of packets, wherein the plurality of packets comprises ciphertext comprising an encrypted server name indication (eSNI) value;
determining whether a plaintext hostname is resolvable from the ciphertext without decrypting the ciphertext;
determining, based on a determination that the plaintext hostname is resolvable from the ciphertext, whether the plaintext hostname matches at least one domain name of the plurality of domain names associated with one or more threats; and
applying, based on a determination that the plaintext hostname matches a first domain name indicated by a first packet-filtering rule of the plurality of packet-filtering rules, a packet filtering operation to the plurality of packets.

22. The method of claim 21, further comprising:
determining a destination network address associated with the plurality of packets;
querying, using the destination network address, a data structure to determine the plaintext hostname associated with the ciphertext; and
receiving, based on the querying the data structure, a response comprising the plaintext hostname associated with the ciphertext.

23. The method of claim 21, further comprising:
determining a destination network address associated with the plurality of packets;

querying, using the destination network address, a data structure to determine the plaintext hostname associated with the ciphertext; and receiving, based on the querying the data structure, a response comprising a plurality of hostnames associated with the destination network address, wherein the plurality of hostnames comprises the plaintext hostname.

24. The method of claim 21, further comprising:

determining a destination network address associated with the plurality of packets;

querying, using the destination network address, a data structure to determine the plaintext hostname associated with the ciphertext;

receiving, based on the querying the data structure, a response that the plaintext hostname cannot be resolved from the destination network address;

transmitting, to a first device that sent the plurality of packets, a response indicating retransmission of the plurality of packets with a plaintext server name indication (SNI); and receiving the retransmission of the plurality of packets with the plaintext SNI.

25. The method of claim 21, further comprising:

receiving, prior to receiving the plurality of packets, a DNS query request and an associated DNS query response;

storing the DNS query in a data structure; and querying, based on receiving the plurality of packets with the ciphertext from the first device, the data structure to determine the plaintext hostname.

26. The method of claim 21, wherein the packet filtering operation comprises blocking the plurality of packets from continuing toward its intended destination, and the method further comprises:

sending, to the first device, a response to the plurality of packets, wherein the response comprises at least one of: a TCP Reset (RST) message or a TLS handshake proxy message.

27. The method of claim 21, further comprising:

receiving a second plurality of packets, wherein the second plurality of packets comprises second ciphertext comprising a second eSNI value;

determining whether a second plaintext hostname is resolvable from the second ciphertext;

determining, based on a determination that the second plaintext hostname is resolvable from the second ciphertext, whether the second plaintext hostname matches at least one domain name of the plurality of domain names associated with one or more threats; and allowing, based on a determination that the second plaintext hostname does not match a domain name indicated by any of the plurality of packet-filtering rules, the second plurality of packets to continue toward its intended destination.

28. The method of claim 27, wherein the second plurality of packets comprise one or more communications for creating a secure communication channel with the intended destination.

29. The method of claim 21, wherein the packet filtering device resides at a boundary that interfaces between a protected network and an unprotected network.

30. The method of claim 21, wherein the packet filtering operation comprises at least one of:

blocking the plurality of packets from continuing toward its intended destination;

allowing the plurality of packets to continue to its intended destination and forwarding a copy of the plurality of packets to a first proxy for monitoring; or forwarding the plurality of packets to a second proxy.

* * * * *